United States Patent
Jarrahi et al.

(10) Patent No.: US 12,498,615 B2
(45) Date of Patent: Dec. 16, 2025

(54) SYSTEMS AND METHODS FOR WAVELENGTH CONVERSION THROUGH PLASMON-COUPLED SURFACE STATES

(71) Applicant: The Regents of the University of California, Oakland, CA (US)

(72) Inventors: Mona Jarrahi, Los Angeles, CA (US); Deniz Turan, Santa Clara, CA (US); Ping-Keng Lu, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 35 days.

(21) Appl. No.: 18/255,546

(22) PCT Filed: Dec. 1, 2021

(86) PCT No.: PCT/US2021/072676
§ 371 (c)(1),
(2) Date: Jun. 1, 2023

(87) PCT Pub. No.: WO2022/154994
PCT Pub. Date: Jul. 21, 2022

(65) Prior Publication Data
US 2024/0004263 A1    Jan. 4, 2024

Related U.S. Application Data

(60) Provisional application No. 63/120,066, filed on Dec. 1, 2020, provisional application No. 63/264,644, filed on Nov. 29, 2021.

(51) Int. Cl.
*G02F 1/35* (2006.01)
*G02B 5/00* (2006.01)

(52) U.S. Cl.
CPC ............ *G02F 1/353* (2013.01); *G02B 5/008* (2013.01); *G02F 2201/30* (2013.01); *G02F 2203/13* (2013.01)

(58) Field of Classification Search
CPC .. G02F 1/353; G02F 2201/30; G02F 2203/13; G02B 5/008; B82Y 20/00; B82Y 25/00
See application file for complete search history.

(56) References Cited

U.S. PATENT DOCUMENTS 6,173,604 B1   1/2001   Xiang et al.
6,529,093 B2   3/2003   Ma
(Continued)

FOREIGN PATENT DOCUMENTS

EP   1804347 A1   7/2007
EP   2807675 A1   12/2014
(Continued)

OTHER PUBLICATIONS

Turan et al., "Terahertz Generation through Bias-free Telecommunication Compatible Photoconductive Nanoantennas over a 5 THz Radiation Bandwidth," 2020 IEEE/MTT-S International Microwave Symposium (IMS), Los Angeles, CA, USA, pp. 87-90 (Year: 2020).*

(Continued)

*Primary Examiner* — Daniel Petkovsek
(74) *Attorney, Agent, or Firm* — KPPB LLP

(57) ABSTRACT

Systems and methods for performing wavelength conversion via plasmon-coupled surface states are described that can be used for optical wavelength conversion to different parts of the electromagnetic spectrum ranging from microwave to infrared regimes in both pulsed and continuous wave operation.

19 Claims, 16 Drawing Sheets

(56) References Cited

U.S. PATENT DOCUMENTS

| | | |
|---|---|---|
| 7,321,275 B2 | 1/2008 | Chou et al. |
| 7,515,801 B2 | 4/2009 | McCaughan et al. |
| 7,599,409 B2 | 10/2009 | Nishizawa et al. |
| 7,710,637 B2 | 5/2010 | Ikari et al. |
| 7,834,722 B2 | 11/2010 | Millet |
| 7,915,641 B2 | 3/2011 | Otsuji et al. |
| 8,450,687 B2 | 5/2013 | Lampin et al. |
| 8,466,528 B2 | 6/2013 | Okamoto et al. |
| 8,514,403 B2 | 8/2013 | Ogawa et al. |
| 8,581,784 B2 | 11/2013 | Nagel |
| 8,610,094 B2 | 12/2013 | Kim et al. |
| 8,649,414 B2 | 2/2014 | Park |
| 8,730,567 B2 | 5/2014 | Kim et al. |
| 9,244,268 B2 * | 1/2016 | Long .................... G02B 26/02 |
| 9,804,026 B2 | 10/2017 | Jarrahi et al. |
| 9,859,079 B2 | 1/2018 | Jarrahi et al. |
| 10,025,123 B1 | 7/2018 | Rakich et al. |
| 10,120,263 B2 | 11/2018 | Jarrahi |
| 10,863,895 B2 | 12/2020 | Jarrahi |
| 11,112,305 B2 | 9/2021 | Jarrahi et al. |
| 11,231,318 B2 | 1/2022 | Jarrahi et al. |
| 11,500,265 B2 * | 11/2022 | Semmlinger ........... G02F 1/353 |
| 2001/0011704 A1 | 8/2001 | Niwa et al. |
| 2003/0184328 A1 | 10/2003 | Lee et al. |
| 2004/0095147 A1 | 5/2004 | Cole |
| 2005/0236260 A1 | 10/2005 | Pasch et al. |
| 2006/0153262 A1 | 7/2006 | Barbieri et al. |
| 2007/0216422 A1 | 9/2007 | Sekiguchi |
| 2007/0278075 A1 | 12/2007 | Terano et al. |
| 2008/0001691 A1 | 1/2008 | Hong et al. |
| 2008/0099698 A1 | 5/2008 | Rahman et al. |
| 2008/0277672 A1 | 11/2008 | Hovey et al. |
| 2009/0259102 A1 | 10/2009 | Koninckx et al. |
| 2009/0261362 A1 | 10/2009 | Ueda et al. |
| 2009/0273532 A1 | 11/2009 | Mendis et al. |
| 2010/0002739 A1 | 1/2010 | Hu et al. |
| 2010/0017922 A1 | 1/2010 | Shin et al. |
| 2010/0102256 A1 | 4/2010 | Andrew et al. |
| 2010/0126566 A1 * | 5/2010 | Ji ........................... G02B 5/008 359/326 |
| 2010/0277726 A1 | 11/2010 | Logan et al. |
| 2011/0028824 A1 | 2/2011 | Cole et al. |
| 2011/0074293 A1 | 3/2011 | Hagmann et al. |
| 2011/0080329 A1 | 4/2011 | Nagel |
| 2011/0141468 A1 | 6/2011 | Kukushkin et al. |
| 2011/0149368 A1 | 6/2011 | Kim et al. |
| 2011/0215246 A1 | 9/2011 | Kajiki |
| 2012/0122259 A1 | 5/2012 | Tung et al. |
| 2012/0147907 A1 | 6/2012 | Kim et al. |
| 2012/0162747 A1 | 6/2012 | Kim et al. |
| 2012/0205767 A1 | 8/2012 | Bai et al. |
| 2012/0294549 A1 | 11/2012 | Doepke |
| 2013/0015375 A1 | 1/2013 | Avouris et al. |
| 2013/0161514 A1 | 6/2013 | Kukushkin et al. |
| 2013/0161541 A1 | 6/2013 | Kim et al. |
| 2013/0284929 A1 | 10/2013 | Ouchi |
| 2014/0103211 A1 | 4/2014 | Darcie et al. |
| 2014/0198973 A1 | 7/2014 | Zhang et al. |
| 2014/0346357 A1 | 11/2014 | Jarrahi et al. |
| 2016/0064110 A1 | 3/2016 | Schmadel et al. |
| 2016/0116406 A1 | 4/2016 | Hunt et al. |
| 2016/0196943 A1 | 7/2016 | Jarrahi et al. |
| 2016/0305869 A1 | 10/2016 | Mann et al. |
| 2017/0123292 A1 | 5/2017 | Jarrahi |
| 2018/0058931 A1 | 3/2018 | Jarrahi et al. |
| 2019/0150719 A1 | 5/2019 | Jarrahi |
| 2020/0064259 A1 | 2/2020 | Jarrahi et al. |
| 2020/0264048 A1 | 8/2020 | Jarrahi et al. |

FOREIGN PATENT DOCUMENTS

| | | |
|---|---|---|
| EP | 3155702 A1 | 4/2017 |
| EP | 3302224 A2 | 4/2018 |
| EP | 2807675 B1 | 9/2018 |
| EP | 3612812 A1 | 2/2020 |
| EP | 3302224 B1 | 10/2020 |
| EP | 3155702 B1 | 12/2020 |
| EP | 4256382 A2 | 10/2023 |
| JP | 11056786 A | 3/1999 |
| JP | 2002511690 A | 4/2002 |
| JP | 2002511960 A | 4/2002 |
| JP | 2006216646 A | 8/2006 |
| JP | 2008122278 A | 5/2008 |
| JP | 2009105102 A | 5/2009 |
| JP | 20099531841 A | 9/2009 |
| JP | 2010510703 A | 4/2010 |
| JP | 2014112078 A | 6/2014 |
| JP | 2015513067 A | 4/2015 |
| JP | 6169614 B2 | 7/2017 |
| JP | 2017523601 A | 8/2017 |
| JP | 2018516667 A | 6/2018 |
| JP | 6860210 B2 | 3/2021 |
| JP | 6955337 B2 | 10/2021 |
| KR | 1020080004467 A | 1/2008 |
| WO | 9846042 A1 | 10/1998 |
| WO | 2005019810 A2 | 3/2005 |
| WO | 2005019810 A3 | 5/2005 |
| WO | 2006030608 A1 | 3/2006 |
| WO | 2010011186 A1 | 1/2010 |
| WO | 2010021073 A1 | 2/2010 |
| WO | 2010044193 A1 | 4/2010 |
| WO | 2011028179 A1 | 3/2011 |
| WO | 2011118398 A1 | 9/2011 |
| WO | 2011129690 A2 | 10/2011 |
| WO | 2012057710 A1 | 5/2012 |
| WO | WO-2013112608 A1 * | 8/2013 ........... H10H 20/831 |
| WO | 2015021100 A1 | 2/2015 |
| WO | 2015192094 A1 | 12/2015 |
| WO | 2016196309 A2 | 12/2016 |
| WO | 2016196309 A3 | 2/2017 |
| WO | 2018195429 A1 | 10/2018 |
| WO | 2021067635 A1 | 4/2021 |
| WO | 2022154994 A2 | 7/2022 |
| WO | 2022154994 A9 | 9/2022 |
| WO | 2022154994 A3 | 10/2022 |

OTHER PUBLICATIONS

European Examination Report Corresponding to EP Application No. 13741491.8, Dated Oct. 21, 2015, 5 pgs.
Extended European Search Report for European Application No. 15807544.0, Search completed Jun. 12, 2018, and Mailed on Jun. 20, 2018, 8 pgs.
Extended European Search Report for European Application No. 16804130.9, Search completed Jan. 16, 2019, Mailed on Jan. 25, 2019, 6 pgs.
Extended European Search Report for European Application No. 18787213.0, Search completed Nov. 30, 2020, Mailed on Dec. 9, 2020, 7 pgs.
Extended European Search Report for European Application No. 21920093.8, Search completed Sep. 5, 2024, Mailed on Sep. 13, 2024, 12 pgs.
International Preliminary Report on Patentability for International Application PCT/US2013/022776, Report issued Jul. 29, 2014, Mailed on Aug. 7, 2014, 8 pgs.
International Preliminary Report on Patentability for International Application PCT/US2014/049866, Report issued Feb. 9, 2016, Mailed on Feb. 18, 2016, 8 pgs.
International Preliminary Report on Patentability for International Application PCT/US2015/035685, Report issued Dec. 15, 2016, Mailed on Dec. 22, 2016, 7 pgs.
International Preliminary Report on Patentability for International Application PCT/US2016/034704, Report issued Nov. 28, 2017, Mailed on Dec. 7, 2017, 10 pgs.
International Preliminary Report on Patentability for International Application PCT/US2018/028579, Report issued Oct. 22, 2019, Mailed on Oct. 31, 2019, 8 pgs.
International Preliminary Report on Patentability for International Application PCT/US2021/072676, Report issued May 30, 2023, Mailed on Jun. 15, 2023, 07 pgs.

(56) References Cited

OTHER PUBLICATIONS

International Search Report and Written Opinion for International Application No. PCT/US2013/022776, Search completed May 15, 2013, Mailed on May 16, 2013, 9 pgs.
International Search Report and Written Opinion for International Application No. PCT/US2014/049866, Search completed Nov. 19, 2014, Mailed on Nov. 20, 2014, 9 pgs.
International Search Report and Written Opinion for International Application No. PCT/US2016/034704, Search completed Dec. 26, 2016, Mailed on Dec. 26, 2016, 11 pgs.
International Search Report and Written Opinion for International Application No. PCT/US2018/028579, Search completed Jul. 5, 2018, Mailed on Jul. 20, 2018, 11 pgs.
International Search Report and Written Opinion for International Application No. PCT/US2020/053860, Search completed Nov. 30, 2020, Mailed on Jan. 6, 2021, 14 pgs.
International Search Report and Written Opinion for International Application No. PCT/US2021/072676, Search completed Jul. 20, 2022, Mailed on Aug. 15, 2022, 11 pgs.
International Search Report and Written Opinion for International Application PCT/US2015/035685, Report Completed Aug. 27, 2015, Mailed on Aug. 27, 2015, 8 pgs.
Supplementary European Search Report for European Application No. 13741491.8, Search completed Sep. 28, 2015, Mailed Oct. 12, 2015, 6 pgs.
Adomavicius et al., "Terahertz emission from p-InAs due to the instantaneous polarization", Applied Physics Letters, vol. 85, No. 13, Sep. 27, 2004, pp. 2463-2465, doi: 10.1063/1.1795980.
Ajito et al., "THz Chemical Imaging for Biological Applications", IEEE Transactions on Terahertz Science and Technology, vol. 1, No. 1, Sep. 2011, pp. 293-300, doi: 10.1109/TTHZ.2011.2159562.
Alshannaq et al., "Controlling aflatoxin contamination and propagation of Aspergillus flavus by a soy-fermenting Aspergillus oryzae strain", Scientific Reports, vol. 8, No. 16871, Nov. 15, 2018, pp. 1-14, doi: 10.1038/s41598-018-35246-1.
Arabshahi et al., "Temperature and Doping Dependencies of Electron Mobility in InAs, AlAs and AlGaAs at High Electric Field Application", Brazilian Journal of Physics, vol. 38, No. 3A, Sep. 2008, pp. 293-296, doi: 10.1590/s0103-97332008000300001.
Arbab et al., "Terahertz Spectroscopy for the Assessment of Burn Injuries in Vivo", Journal of Biomedical Optics, vol. 18, No. 7, Jul. 2013, pp. 077004_1-077004_7, doi: 10.1117/1.JBO.18.7.077004.
Ashworth et al., "Terahertz pulsed spectroscopy of freshly excised human breast cancer", Optics Express, vol. 17, No. 15, Jul. 20, 2009, pp. 12444-12454, doi: 10.1364/OE.17.012444.
Aslam et al., "Controlling energy flow in multimetallic nanostructures for plasmonic catalysis", Nature Nanotechnology, vol. 12, No. 10, Jul. 17, 2017, pp. 1-6, doi: 10.1038/nnano.2017.131.
Atwater et al., "Plasmonics for Improved Photovoltaic Devices", Nature Materials, vol. 9, No. 3, Mar. 2010, pp. 205-213, doi: 10.1038/NMAT2629.
Auston et al., "Picosecond photoconducting Hertzian dipoles", Applied Physics Letters, vol. 45, No. 3, Aug. 1, 1984, pp. 284-286, doi: 10.1063/1.95174.
Baek et al., "Detection of Melamine in Foods Using Terahertz Time-Domain Spectroscopy", Journal of Agriculture and Food Chemistry, vol. 62, No. 24, Jun. 2, 2014, pp. 5403-5407, doi: 10.1021/jf501170z.
Baker et al., "Self-Triggered Asynchronous Optical Sampling Terahertz Spectroscopy Using a Bidirectional Mode-locked Fiber Laser", Scientific Reports, vol. 8, No. 14802, Oct. 4, 2018, 8 pgs., doi: 10.1038/s41598-018-33152-0.
Balanis, "Linear Wire Antennas", Antenna Theory; Analysis and Design, John Wiley & Sons, Hoboken NJ, Third Edition, 2005, pp. 151-385.
Bashirpour et al., "Improvement of Terahertz Photoconductive Antenna using Optical Antenna Array of ZnO Nanorods", Scientific Reports, vol. 9, No. 1414, Feb. 5, 2019, 8 pgs., doi: 10.1038/s41598-019-38820-3.
Bashirpour et al., "Terahertz radiation enhancement in dipole photoconductive antenna on LT-GaAs using a gold plasmonic nanodisk array", Optics & Laser Technology, vol. 120, No. 105726, Dec. 2019, 6 pgs., doi: 10.1016/j.optlastec.2019.
Beck et al., "Impulsive terahertz radiation with high electric fields from an amplifier-driven large-area photoconductive antenna", Optics Express, vol. 18, No. 9, Apr. 26, 2010, pp. 9251-9257, doi: 10.1364/OE.18.009251.
Bennett et al., "Aflatoxins: Background, Toxicology, and Molecular Biology", Infectious Disease: Foodborne Diseases, Humana Press, 2007, pp. 355-373, doi: 10.1007/978-1-59745-501-5_13.
Berry et al., "Design, Fabrication, and Experimental Characterization of Plasmonic Photoconductive Terahertz Emitters", Journal of Visualized Experiments, vol. 77, No. e50517, Jul. 2013, pp. 1-8, doi: 10.3791/50517.
Berry et al., "Generation of high power pulsed terahertz radiation using a plasmonic photoconductive emitter array with logarithmic spiral antennas", Applied Physics Letters, vol. 104, No. 8, Feb. 2014, pp. 081122-1-081122-4, doi: 10.1063/1.4866807.
Berry et al., "High power terahertz generation using 1550 nm plasmonic photomixers", Applied Physics Letters, vol. 105, Jul. 10, 2014, pp. 011121-1-011121-4, doi: 10.1063/1.4890102.
Berry et al., "Nanoscale Contact Electrodes for Significant Radiation Power Enhancement in Photoconductive Terahertz Emitters", IEEE MTT-S, International Microwave Symposium Digest (MTT), 2013, pp. 1-4, doi: 10.1109/MWSYM.2013.6697515.
Berry et al., "Plasmonic Photomixers for Increased Terahertz Radiation Powers at 1550 nm Optical Pump Wavelength", Conference on Lasers and Electro-Optics (CLEO)—Laser Science to Photonic Applications, 2014, pp. 1-2, doi: 10.1364/CLEO_SI.2014.STu1M.2.
Berry et al., "Plasmonically-Enhanced Localization of Light into Photoconductive Antennas", CLEO/QELS: Laser Science to Photonic Applications, 2010, pp. 1-2, doi: 10.1364/CLEO.2010.CFI2.
Berry et al., "Plasmonics enhanced photomixing for generating quasi-continuous-wave frequency-tunable terahertz radiation", Optics Letters, vol. 39, No. 15, Aug. 1, 2014, pp. 4522-4524, doi: 10.1364/OL.39.004522.
Berry et al., "Principles of Impedance Matching in Photoconductive Antennas", Journal of Infrared, Millimeter, and Terahertz Waves, vol. 33, Sep. 27, 2012, pp. 1182-1189, doi: 10.1007/s10762-012-9937-3.
Berry et al., "Significant performance enhancement in photoconductive terahertz optoelectronics by incorporating plasmonic contact electrodes", Nature Communication, vol. 4, No. 1622, Mar. 27, 2013, pp. 1-10, doi: 10.1038/ncomms.2638.
Berry et al., "Terahertz generation using plasmonic photoconductive gratings", New Journal of Physics, vol. 14, No. 105029, Oct. 30, 2012, 12 pgs., doi: 10.1088/1367-2630/14/10/105029.
Berry et al., "Ultrafast Photoconductors based on Plasmonic Gratings", International Conference on Infrared, Millimeter, and Terahertz Waves, 2011, pp. 1-2, doi: 10.1109/irmmw-THz.2011.6105050.
Bjarnason et al., "ErAs: GaAs photomixer with two-decade tunability and 12 µW peak output power", Applied Physics Letters, vol. 85, No. 18, Nov. 1, 2004, pp. 3983-3985, doi: 10.1063/1.1813635.
Blanchard et al., "Effect of extreme pump pulse reshaping on intense terahertz emission in lithium niobate at multimilliJoule pump energies", Optics Letters, vol. 39, No. 15, Aug. 1, 2014, pp. 4333-4336, doi: 10.1364/OL.39.004333.
Blanchard et al., "Generation of 1.5 microJ single-cycle terahertz pulses by optical rectification from a large aperture ZnTe crystal", Optics Express, vol. 15, No. 20, Oct. 1, 2007, first published Sep. 27, 2007, pp. 13212-13220, doi: 10.1364/OE.15.013212.
Brennan, "Theory of the steady-state hole drift velocity in InGaAs", Applied Physics Letters, vol. 51, No. 3, Sep. 28, 1987, pp. 995-997, doi: 10.1063/1.98787.
Brennan et al., "High field transport in GaAs, InP and InAs", Solid-State Electronics, vol. 27, No. 4, Apr. 1984, pp. 347-357, doi: 10.1016/0038-1101(84)90168-0.
Brongersma et al., "Plasmon-induced hot carrier science and technology", Nature Nanotechnology, vol. 10, No. 1, Jan. 6, 2015, pp. 25-34, doi: 10.1038/nnano.2014.311.

(56) References Cited

OTHER PUBLICATIONS

Brown et al., "Characterization of a Planar Self-Complementary Square-Spiral Antenna in the THz Region", Microwave and Optical Technology Letters, vol. 48, No. 3, Mar. 2006, pp. 524-529, doi: 10.1002/mop.
Brown et al., "Coherent millimeter-wave generation by heterodyne conversion in low-temperature-grown GaAs photoconductors", Journal of Applied Physics, vol. 73, No. 3, Feb. 1, 1993, pp. 1480-1484, doi: 10.1063/1.353222.
Brunner et al., "A hydrogen-bonded organic nonlinear optical crystal for high-efficiency terahertz generation and detection", Optics Express, vol. 16, No. 21, Oct. 13, 2008, first published Oct. 3, 2008, pp. 16496-16508, doi: 10.1364/oe.16.016496.
Cassel et al., "Aflatoxins: Hazards in Grain/Aflatoxicosis and Livestock", South Dakota State University, Fact Sheets, Paper 86, Oct. 1, 2001, 4 pgs.
Castro-Camus et al., "Leaf water dynamics of *Arabidopsis thaliana* monitored in-vivo using terahertz time-domain spectroscopy", Scientific Reports, vol. 3, No. 2910, Oct. 9, 2013, pp. 1-5, doi: 10.1038/srep02910.
Catrysse et al., "Guided modes supported by plasmonic films with a periodic arrangement of subwavelength slits", Applied Physics Letters, vol. 88, No. 3, 2006, pp. 031101-1-031101-3, doi: 10.1063/1.2164905.
Chan et al., "Imaging with terahertz radiation", Reports on Progress in Physics, vol. 70, No. 8, Jul. 12, 2007, pp. 1325-1379, doi: 10.1088/0034-4885/70/8/R02.
Chang et al., "Power scalable compact THz system based on an ultrafast Yb-doped fiber amplifier", Optics Express, vol. 14, No. 17, Aug. 21, 2006, pp. 7909-7913. doi: 10.1364/OE.14.007909.
Chen et al., "A Preliminary Study of Aflatoxin B1 Detection in Peanut Oil by Terahertz Time-Domain Spectroscopy", Transactions of the ASABE, vol. 57, No. 6, 2014, pp. 1793-1799, doi: 10.13031/trans.57.10725.
Chen et al., "Oxidized-monolayer tunneling barrier for strong Fermi-level depinning in layered InSe transistors", npj 2D Materials and Applications, vol. 3, No. 49, Dec. 13, 2019, 7 pgs., https://doi.org/10.1038/s41699-019-0133-3.
Chimot et al., "Photomixing at 1.55 μm in Ion-Irradiated In0.53GA0.47As on InP", Optics Express, vol. 14, No. 5, Mar. 6, 2006, pp. 1856-1861.
Chimot et al., "Terahertz radiation from heavy-ion-irradiated In0.53Ga0.47As photoconductive antenna excited at 1.55μm", Applied Physics Letters, vol. 87, No. 19, Nov. 4, 2005, pp. 1-3, pp. doi: 10.1063/1.2126110.
Clothier et al., "Effects of THz Exposure on Human Primary Keratinocyte Differentiation and Viability", Journal of Biological Physics, vol. 29, 2003, pp. 179-185, doi: 10.1023/a:1024492725782.
Cubukcu et al., "Plasmonic laser antenna", Applied Physics Letters, vol. 89, No. 9, Aug. 31, 2006, pp. 093120-1-093120-3, doi: 10.1063/1.2339286.
Delmulle et al., "Development of an Immunoassay-Based Lateral Flow Dipstick for the Rapid Detection of Aflatoxin B1 in Pig Feed", Journal of Agricultural and Food Chemistry, vol. 53, No. 9, Apr. 8, 2005, pp. 3364-3368, doi: 10.1021/jf0404804.
Dietz et al., "64 μW pulsed terahertz emission from growth optimized InGaAs/InAlAs heterostructures with separated photoconductive and trapping regions", Applied Physics Letters, vol. 103, No. 6, Aug. 5, 2013, pp. 1-4, doi: 10.1063/1.4817797.
Dietz et al., "THz generation at 1.55 μm excitation: six-fold increase in THz conversion efficiency by separated photoconductive and trapping regions", Optics Express, vol. 19, No. 27, Dec. 19, 2011, pp. 25911-25917, doi: s10.1364/OE.19.025911.
Dohler et al., "THz-photomixer based on quasi-ballistic transport", Semiconductor Science and Technology, vol. 20, No. 7, Jun. 8, 2005, pp. S178-S190, doi: 10.1088/0268-1242/20/7/007.
Dreyhaupt et al., "High-intensity terahertz radiation from a microstructured large-area photoconductor", Applied Physics Letters, vol. 86, No. 12, Mar. 2005, pp. 121114-1-121114-3, doi: 10.1063/1.1891304.

Fesharaki et al., "Plasmonic Antireflection Coating for Photoconductive Terahertz Generation", ACS Photonics, vol. 4, No. 6, May 31, 2017, pp. 1350-1354, doi: 10.1021/acsphotonics.7b00410.
Fitzgerald et al., "Catalogue of Human Tissue Optical Properties at Terahertz Frequencies", Journal of Biological Physics, vol. 29, Jun. 2003, pp. 123-128, doi: 10.1023/A:1024428406218.
Fitzgerald et al., "Nondestructive Analysis of Tablet Coating Thicknesses Using Terahertz Pulsed Imaging", Journal of Pharmaceutical Sciences, vol. 94, No. 1, Jan. 2005, pp. 177-183, doi: 10.1002/jps.20225.
Fulop et al., "Efficient generation of THz pulses with 0.4 mJ energy", Optics Express, vol. 22, No. 17, Aug. 25, 2014, pp. 20155-20163, doi: 10.1364/OE.22.020155.
Fulop et al., "Generation of sub-mJ terahertz pulses by optical rectification", Optics Letters, vol. 37, No. 4, Feb. 15, 2012, pp. 557-559, doi: 10.1364/OL.37.000557.
Ge et al., "Quantitative determination of aflatoxin B1 concentration in acetonitrile by chemometric methods using terahertz spectroscopy", Food Chemistry, vol. 209, Oct. 15, 2016, pp. 286-292, doi: 10.1016/j.foodchem.2016.04.070.
Globisch et al., "Absolute terahertz power measurement of a time-domain spectroscopy system", Optics Letters, vol. 40, No. 15, Aug. 1, 2015, pp. 3544-3547, doi: 10.1364/OL.40.003544.
Globisch et al., "Iron doped InGaAs: Competitive THz emitters and detectors fabricated from the same photoconductor", Journal of Applied Physics, vol. 121, No. 5, Feb. 1, 2017, pp. 1-12, doi: 10.1063/1.4975039.
Gordon et al., "The HITRAN2016 molecular spectroscopic database", Journal of Quantitative Spectroscopy and Radiative Transfer, vol. 203, Dec. 2017, pp. 3-69, doi: 10.1016/j.jqsrt.2017.06.038.
Gowen et al., "Terahertz time domain spectroscopy and imaging: Emerging techniques for food process monitoring and quality control", Trends in Food Science & Technology, vol. 25, No. 1, May 2012, pp. 40-46, doi: 10.1016/j.tifs.2011.12.006.
Gregory et al., "Optimization of Photomixers and Antennas for Continuous-Wave Terahertz Emission", IEEE Journal of Quantum Electronics, vol. 41, No. 5, May 2005, pp. 717-728, doi: 10.1109/JQE.2005.844471.
Grischkowsky et al., "Far-infrared time-domain spectroscopy with terahertz beams of dielectrics and semiconductors", Journal of the Optical Society of America B, vol. 7, No. 10, Oct. 1990, pp. 2006-2015, doi: 10.1364/JOSAB.7.002006.
Gu et al., "Detection of terahertz radiation from longitudinal optical phonon-plasmon coupling modes in InSb film using an ultrabroadband photoconductive antenna", Applied Physics Letters, vol. 77, No. 12, Sep. 18, 2000, pp. 1798-1800, doi: 10.1063/1.1311609.
Gupta et al., "Enhanced optical-to-THz conversion efficiency of photoconductive antenna using dielectric nano-layer encapsulation", APL Photonics, vol. 3, No. 5, Mar. 26, 2018, pp. 1-6, doi: 10.1063/1.5021023.
Haase et al., "Subthreshold electron velocity-field characteristics of GaAs and In0.53Ga0.47As", Journal of Applied Physics, vol. 57, No. 6, Mar. 15, 1985, pp. 2295-2298, doi: 10.1063/1.335464.
Harmon et al., "Minority-carrier mobility enhancement in p+ InGaAs lattice matched to InP", Applied Physics Letters, vol. 63, No. 5, Aug. 2, 1993, pp. 636-638, doi: 10.1063/1.109974.
Hauri et al., "Strong-field single-cycle THz pulses generated in an organic crystal", Applied Physics Letters, vol. 99, No. 16, Oct. 20, 2011, pp. 161116-1-16116-3, doi: 10.1063/1.3655331.
Heshmat et al., "Nanoplasmonic Terahertz Photoconductive Switch on GaAs", Nano Letters, vol. 12, No. 12, Nov. 21, 2012, pp. 6255-6259, doi: 10.1021/nl303314a.
Hirori et al., "Single-cycle terahertz pulses with amplitudes exceeding 1 MV/cm generated by optical rectification in LiNbO3", Applied Physics Letters, vol. 98, No. 9, Mar. 2, 2011, pp. 091106_1-091106_3, doi: 10.1063/1.3560062.
Hoffmann et al., "Efficient terahertz generation by optical rectification at 1035 nm", Optics Express, vol. 15, No. 18, Sep. 3, 2007, pp. 11706-11713, doi: 10.1364/OE.15.011706.
Hsieh et al., "Analysis of Periodic metallic nano-slits for efficient interaction of terahertz and optical waves at nano-scale dimensions", Journal of Applied Physics, vol. 109, No. 8, Apr. 21, 2011, pp. 084326-1-084326-5, doi: 10.1063/1.3567909.

(56) References Cited

OTHER PUBLICATIONS

Hu et al., "Imaging with Terahertz Waves", Optics Letters, vol. 20, No. 16, Aug. 15, 1995, pp. 1716-1718, doi: 10.1364/OL.20.001716.
Huang et al., "Highly efficient terahertz pulse generation by optical rectification in stoichiometric and cryo-cooled congruent lithium niobate", Journal of Modern Optics, vol. 62, No. 18, 2014, pp. 1486-1493, doi: 10.1080/09500340.2013.868547.
Huang et al., "Tissue characterization using terahertz pulsed imaging in reflection geometry", Physics in Medicine and Biology, vol. 54, 2009, pp. 149-160, doi: 10.1088/0031-9155/54/1/010.
Humphreys et al., "Medical applications of terahertz imaging: a review of current technology and potential applications in biomedical engineering", Proceedings of the 26th Annual International Conference of the IEEE EMBS, Sep. 1-5, 2004, pp. 1302-1305, doi: 10.1109/IEMBS.2004.1403410.
Huo et al., "Planar Log-Periodic Antennas on Extended Hemishperical Silicon Lenses for Millimeter/Submillimeter Wave Detection Applications", International Journal of Infrared and Millimeter Waves, vol. 23, No. 6, Jun. 2002, pp. 819-839, doi: 10.1023/A:1015738932198.
Jacques, "Optical properties of biological tissues: a review", Physics in Medicine and Biology, vol. 58, No. 11, May 10, 2013, pp. R37-R61, doi: 10.1088/0031-9155/58/11/R37.
Jarrahi, "Advanced Photoconductive Terahertz Optoelectronics Based on Nano-Antennas and Nano-Plasmonic Light Concentrators", IEEE Transactions on Terahertz Science and Technology, vol. 5, No. 3, May 2015, pp. 391-397, doi: 10.1109/TTHZ.2015.2406117.
Jarrahi, "Terahertz Radiation-Band Engineering Through Spatial Beam-Shaping", IEEE Photonics Technology Letters, vol. 21, No. 13, Jul. 1, 2009, pp. 830-832, doi: 10.1109/LPT.2009.2019620.
Jarrahi et al., "High-power tunable terahertz generation based on photoconductive antenna arrays", IEEE MTT-S International Microwave Symposium Digest, Jun. 15-20, 2008, pp. 391-394, doi: 10.1109/MWSYM.2008.4633185.
Jepsen et al., "Generation and detection of terahertz pulses from biased semiconductor antennas", Journal of the Optical Society of America B, vol. 13, No. 11, Nov. 1996, pp. 2424-2435, doi: 10.1364/JOSAB.13.002424.
Jewariya et al., "Enhancement of terahertz wave generation by cascaded $\chi^{(2)}$ processes in $LiNbO_3$", Journal of the Optical Society of America B, vol. 26, No. 9, Sep. 2009, pp. A101-A106, doi: 10.1364/JOSAB.26.00A101.
Johnston et al., "Generation of high-power terahertz pulses in a prism", Optics Letters, vol. 27, No. 21, Nov. 1, 2002, pp. 1935-1937, doi: 10.1364/ol.27.001935.
Johnston et al., "Simulation of terahertz generation at semiconductor surfaces", Physical Review B, vol. 65, No. 16, Mar. 18, 2002, pp. 165301-1-165301-8, doi: 10.1103/PhysRevB.65.165301.
Jooshesh et al., "Plasmon-enhanced LT-GaAs/AlAs heterostructure photoconductive antennas for sub-bandgap terahertz generation", Optics Express, vol. 25, No. 18, Sep. 4, 2017, pp. 22140-22148, doi: 10.1364/OE.25.022140.
Kalem et al., "Growth and transport properties of InAs epilayers on GaAs", Applied Physics Letters, vol. 53, No. 17, Oct. 24, 1988, pp. 1647-1649, doi: 10.1063/1.99938.
Khorshidi et al., "Increase in terahertz radiation power of plasmonic photoconductive antennas by embedding buried three-stepped rods in electrodes", Optics Express, vol. 27, No. 16, Aug. 5, 2019, pp. 22327-22338, doi: 10.1364/OE.27.022327.
Khutsishvilii et al., "The Features of Electronic Conduction in InAs", European Journal of Eng. Technology & Research, vol. 6, No. 3, Apr. 6, 2021, pp. 75-78, doi: 10.24018/ejers.2021.6.3.2401.
Kidd et al., "Comparison of the crystalline quality of step-graded and continuously graded InGaAs buffer layers", Journal of Crystal Growth, vol. 169, No. 4, Dec. 2, 1996, pp. 649-659, doi: 10.1016/S0022-0248(96)00665-3.
Klatt et al., "Photo-Dember terahertz emitter excited with an Er:fiber laser", Applied Physics Letters, vol. 98, No. 2, Jan. 13, 2011, pp. 021114-1-021114-3, doi: 10.1063/1.3543627.
Knight et al., "Photodetection with Active Optical Antennas", Science, vol. 332, No. 6030, May 6, 2011, pp. 702-704, doi: 10.1126/science.1203056.
Kohlhaas et al., "637 µW emitted terahertz power from photoconductive antennas based on rhodium doped InGaAs", Applied Physics Letters, vol. 117, No. 13, Sep. 2020, pp. 131105_1-131105_4, doi: 10.1063/5.0020766.
Kokkonen et al., "Determination of selected mycotoxins in mould cheeses with liquid chromatography coupled to tandem with mass spectrometry", Food Additives and Contaminants, vol. 22, No. 5, May 2005, pp. 449-456, doi: 10.1080/02652030500089861.
Krishnamachari et al., "Hepatitis Due to Aflatoxicosis: an Outbreak in Western India", The Lancet, vol. 305, No. 7915, May 10, 1975, pp. 1061-1063, doi: 10.1016/S0140-6736(75)91829-2.
Lavrukhin et al., "Terahertz photoconductive emitter with dielectric-embedded high-aspect-ratio plasmonic grating for operation with low-power optical pumps", AIP Advances, vol. 9, No. 1, Jan. 14, 2019, pp. 015112-1-015112-5, doi: 10.1063/1.5081119.
Lee et al., "High-quality metamorphic compositionally graded InGaAs buffers", Journal of Crystal Growth, vol. 312, No. 2, 2010, pp. 250-257, doi: 10.1016/j.jcrysgro.2009.10.041.
Li et al., "A polarization-insensitive plasmonic photoconductive terahertz emitter", AIP Advances, vol. 7, No. 11, Nov. 16, 2017, pp. 115113-1-15513-6, doi: 10.1063/1.5006273.
Liu et al., "Coherent Detection of Multiband Terahertz Radiation Using a Surface Plasmon-Polariton Based Photoconductive Antenna", IEEE Transactions on Terahertz Science and Technology, vol. 1, No. 2, Nov. 2011, pp. 412-415, doi: 10.1109/TTHZ/2011.2165241.
Liu et al., "Contact engineering for organic semiconductor devices via Fermi level depinning at the metal-organic interface", Physical Review. B, vol. 82, No. 3, Jul. 20, 2010, pp. 035311_1-035311_6, doi: 10.1103/PhysRevB.82.035311.
Liu et al., "Terahertz radiation from InAs induced by carrier diffusion and drift", Physical Review B, vol. 73, No. 155330, Apr. 2006, pp. 155330-1-155330-6, doi: 10.1103/PhysRevB.73.155330.
Liu et al., "Van der Waals metal-semiconductor junction: Weak Fermi level pinning enables effective tuning of Schottky barrier", Science Advances, vol. 2, No. 4, Apr. 22, 2016, 6 pgs., doi: 10.1126/sciadv.1600069.
Loata et al., "Radiation Field Screening in Photoconductive Antennae Studied via Pulsed Terahertz Emission Spectroscopy", Applied Physics Letters, vol. 91, Dec. 2007, pp. 232506-1-232506-3, doi: 10.1063/1.2823590.
Lu et al., "Efficient terahertz generation in highly nonlinear organic crystal HBM-TMS", Optics Express, vol. 26, No. 23, Nov. 12, 2018, pp. 30786-30794, doi: 10.1364/OE.26.030786.
Lu et al., "Plasmonic nanolaser using epitaxially grown silver film", Science, vol. 337, No. 6093, Jul. 27, 2012, pp. 450-453, doi: 10.1126/science.1223504.
Malone et al., "Determination of Aflatoxins in Grains and Raw Peanuts by a Rapid Procedure with Fluorometric Analysis", Journal of AOAC International, vol. 83, No. 1, Jan. 1, 2000, pp. 95-98, doi: 10.1093/jaoac/83.1.95.
Mangeney et al., "Continuous Wave Terahertz Generation up to 2 THz by Photomixing on Ion-Irradiated In0.53Ga0.47As at 1.55 µm Wavelengths", Applied Physics Letters, vol. 91, Dec. 10, 2007, pp. 241102-1-241102-3, doi: 10.1063/1.2817607.
Mangeney et al., "Emission characteristics of ion-irradiated In0.53Ga0.47As based photoconductive antennas excited at 1.55 µm", Optics Express, Vo. 15, No. 14, Jul. 9, 2007, pp. 8943-8950, doi: 10.1364/OE.15.008943.
Mangeney et al., "Ion-irradiated In 0.53Ga 0.47As photoconductive antennas for THz generation and detection at 1.55 µm wavelengt", Comptes Rendus Physique, vol. 9, No. 2, Mar. 2008, pp. 142-152, doi: 10.1016/j.crhy.2007.07.008.
Matsura et al., "Generation of coherent terahertz radiation by photomixing in dipole photoconductive antennas", Applied Physics Letters, vol. 70, No. 5, Feb. 3, 1997, pp. 559-561, doi: 10.1063/1.118337.
Michael et al., "Large-area traveling-wave photonic mixers for increased continuous terahertz power", Applied Physics Letters, vol. 86, No. 11, Mar. 11, 2005, pp. 111120-1-111120-3, doi: 10.1063/1.1884262.

(56) References Cited

OTHER PUBLICATIONS

Middendorf et al., "THz generation using extrinsic photoconductivity at 1550 nm", Optics Express, vol. 20, No. 15, Jul. 16, 2012, pp. 16504-16509, doi: 10.1364/OE.20.016504.
Mingardi et al., "High power generation of THz from 1550-nm photoconductive emitters", Optics Express, vol. 26, No. 11, May 28, 2018, pp. 14472-14478, doi: 10.1364/OE.26.014472.
Monch, "On the physics of metal-semiconductor interfaces", Reports on Progress in Physics, vol. 53, No. 3, 1990, pp. 221-278, doi: 10.1088/0034-4885/53/3/001.
Nagatsuma et al., "Terahertz Imaging Based on Optical Coherence Tomography", Photonics Research, vol. 2, No. 4, Aug. 2014, pp. B64-B69, doi: 10.1364/PRJ.2.000B64.
Nandi et al., "1550-nm Driven ErAs:In(Al)GaAs Photoconductor-Based Terahertz Time Domain System with 6.5 THz Bandwidth", Journal of Infrared Millimeter and Terahertz Waves, vol. 39, Feb. 16, 2018, pp. 340-348, doi: 10.1007/s10762-018-0471-9.
Nandi et al., "Antenna-coupled spintronic terahertz emitters driven by a 1550 nm femtosecond laser oscillator", Applied Physics Letters, vol. 115, No. 2, Jul. 9, 2019, pp. 022405_1-022405_5, doi: 10.1063/1.5089421.
Noginov et al., "Demonstration of a spaser-based nanolaser", Nature, vol. 460, Aug. 27, 2009, pp. 1110-1112, doi: 10.1038/nature08318.
Okyay et al., "High-Efficiency Metal-Semiconductor-Metal Photodetectors on Heteroepitaxially Grown Ge on Si", Optics Letters, vol. 31, No. 17, Sep. 1, 2006, pp. 2565-2567, doi: 10.1364/OL.31.002565.
Oulton et al., "Plasmon lasers at deep subwavelength scale", Nature, vol. 461, Oct. 1, 2009, pp. 629-632, doi: 10.1038/nature08364.
Pala et al., "Design of Plasmonic Thin-Film Solar Cells with Broadband Absorption Enhancements", Advanced Materials, vol. 21, No. 34, Sep. 3, 2009, pp. 3504-3509, doi: 10.1002/adma.200900331.
Park et al., "Dynamic thermal emission control with InAs-based plasmonic metasurfaces", Science Advances, vol. 4, No. 12, Article No. eaat3163, Dec. 7, 2018, pp. 1-7, doi: 10.1126/sciadv.aat3163.
Park et al., "Enhancement of Terahertz Pulse Emission by Optical Nanoantenna", ACS Nano, vol. 6, No. 3, Feb. 17, 2012, pp. 2026-2031, doi: 10.1021/nn204542x.
Park et al., "Terahertz photoconductive antenna with metal nanoislands", Optics Express, vol. 20, No. 23, Nov. 5, 2012, pp. 25530-25535.
Parrott et al., "Terahertz spectroscopy: Its future role in medical diagnoses", Journal of Molecular Structure, vol. 1006, No. 1-3, Dec. 14, 2011, pp. 66-76, doi: 10.1016/j.molstruc.2011.05.048.
Pearson et al., "Detecting Aflatoxin in Single Corn Kernels by Transmittance and Reflectance Spectroscopy", Transactions of the ASAE, vol. 44, No. 5, 2001, pp. 1247-1254, doi: 10.13031/2013.6418.
Peter et al., "Coherent terahertz detection with a large-area photoconductive antenna", Applied Physics Letters, vol. 91, No. 081109, Aug. 21, 2007, pp. 40-42, doi: 10.1063/1.2772783.
Peytavit et al., "Continuous Terahertz-Wave Generation Using a Monolithically Integrated Horn Antenna", Applied Physics Letters, vol. 93, Sep. 16, 2008, pp. 111108-1-111108-3, doi: 10.1063/1.2983741.
Peytavit et al., "Milliwatt-Level Output Power in the Sub-Terahertz Range Generated by Photomixing in a GaAs Photoconductor", Applied Physics Letters, vol. 99, Nov. 2011, pp. 223508-1-223508-3, doi: 10.1063/1.3664635.
Pickwell-MacPherson, "Practical Considerations for in Vivo THz Imaging", Terahertz Science and Technology, vol. 3, No. 4, Dec. 2010, pp. 163-171, doi: 10.11906/TST.163-171.2010.12.16.
Piper et al., "Electron depletion at InAs free surfaces: Doping-induced acceptorlike gap states", Physical Review B, vol. 73, No. 195321, May 23, 2006, pp. 195321_1-195321_7, doi, 10.1103/PhysRevB.73.195321.
Preu et al., "1550 nm ErAs: In(Al)GaAs Large Area Photoconductive Emitters", Applied Physics Letters, vol. 101, Sep. 2012, pp. 101105-1-101105-4, doi: 10.1063/1.4750244.

Preu et al., "Tunable, continuous-wave Terahertz photomixer sources and applications", Journal of Applied Physics, vol. 109, Mar. 22, 2011, pp. 016301_1-061301_56, doi: 10.1063/1.3552291.
Pupeza et al., "Highly accurate optical material parameter determination with THz time-domain spectroscopy", Optics Express, vol. 15, No. 7, Apr. 2, 2007, pp. 4335-4350, doi: 10.1364/OE.15.004335.
Qu et al., "Review of theoretical methods and research aspects for detecting leaf water content using terahertz spectroscopy and imaging", International Journal of Agricultural and Biological Engineering, vol. 11, No. 5, Sep. 2018, pp. 27-34, doi: 10.25165/j.ijabe.20181105.3952.
Rastinehad et al., "Gold nanoshell-localized photothermal ablation of prostate tumors in a clinical pilot device study", PNAS, vol. 116, No. 37, Sep. 10, 2019, pp. 18590-18596, doi: 10.1073/pnas.1906929116.
Reid et al., "Quantitative comparison of terahertz emission from (100) InAs surfaces and a GaAs large-aperture photoconductive switch at high fluences", Applied Optics, vol. 44, No. 1, Jan. 1, 2005, pp. 149-153. doi: 10.1364/ao.44.000149.
Richard et al., "Mycotoxins: Risks in Plant, Animal, and Human Systems", Council for Agricultural Science and Technology, Task Force Report, No. 139, Jan. 2003, 217 pgs., (presented in 2 parts).
Roehle et al., "Next generation 1.5 µm terahertz antennas: mesa-structuring of InGaAs/InAlAs photoconductive layers", Optics Express, vol. 18, No. 3, Feb. 1, 2010, pp. 2296-2301, doi: 10.1364/OE.18.002296.
Rovere et al., "Generation of high-field terahertz pulses in an HMQ-TMS organic crystal pumped by an ytterbium laser at 1030 nm", Optics Express, vol. 26, No. 3, Feb. 5, 2018, pp. 2509-2516, doi: 10.1364/OE.26.002509.
Ruchert et al., "Scaling submillimeter single-cycle transients toward megavolts per centimeter field strength via optical rectification in the organic crystal OH1", Optics Letters, vol. 37, No. 5, Mar. 1, 2012, pp. 899-901, doi: 10.1364/OL.37.000899.
Ruchert et al., "Spatiotemporal focusing dynamics of intense supercontinuum THz pulses", Physical Review Letters, vol. 110, No. 12, Article No. 123902, Mar. 22, 2013, pp. 123902_1-123902_5, doi: 10.1103/PhysRevLett.110.123902.
Sabatini et al., "Monte Carlo study of ballistic effects in high speed InAs-based quantum hot electron transistor", International Conference on Infrared, Millimeter, and Terahertz Waves, Sep. 2010, pp. 1-2, doi: 10.1109/ICIMW.2010.5612857.
Sartorius et al., "All-fiber terahertz time-domain spectrometer operating at 1.5 microm telecom wavelengths", Optics Express, vol. 16, No. 13, Jun. 23, 2008, pp. 9565-9570, doi: 10.1364/OE.16.009565.
Satyanadh et al., "Monte Carlo calculation of electron drift characteristics and avalanche noise in bulk InAs", Journal of Applied Physics, vol. 91, No. 3, Feb. 1, 2022, pp. 1331-1338, doi: 10.1063/1.1429771.
Savich et al., "Suppression of surface leakage currents using molecular beam epitaxy-grown unipolar barriers", Journal of Vacuum Science & Technology B, vol. 28, No. 23, 2010, Apr. 7, 2010, pp. C3H18-C3H21, doi: 10.1116/1.3276513.
Schmale, III et al., "Mycotoxins in Crops: a Threat to Human and Domestic Animal Health", The Plant Health Instructor, Jan. 1, 2009, 19 pgs., doi: 10.1094/PHI-I-2009-0715-01.
Schuller et al., "Plasmonics for extreme light concentration and manipulation", Nature Materials, vol. 9, No. 3, Mar. 2010, pp. 193-204, doi: 10.1038/nmat2630.
Seifert et al., "Efficient metallic spintronic emitters of ultrabroadband terahertz radiation", Nature Photonics, vol. 10, Jul. 2016, pp. 483-488, doi: 10.1038/nphoton.2016.91.
Seifert et al., "Ultrabroadband single-cycle terahertz pulses with peak fields of 300 kV cm-1 from a metallic spintronic emitter", Applied Physics Letters, vol. 110, No. 25, Jun. 19, 2017, pp. 252402_1-252402_5, doi: 10.1063/1.4986755.
Shen et al., "Properties of a one-dimensional metallophotonic crystal", Physical Review B, vol. 70, Jul. 2004, pp. 035101_1-038101_8, doi: 10.1103/PhysRevB.70.035101.
Shibuya et al., "Enhancement of THz Photomixing Efficiency by Using a Pulse-Modulated Multimode Laser Diode", Joint 32nd International Conference on Infrared and Millimeter Waves and the

(56) References Cited

OTHER PUBLICATIONS

15th International Conference on Terahertz Electronics, Sep. 2007, 2 pgs., doi: 10.1109/ICIMW.2007.4516704.
Smith et al., "Comparison of photoexcited p-InAs THz radiation source with conventional thermal radiation sources", Journal of Applied Physics, vol. 105, Mar. 2009, pp. 063109_1-063109_4, doi: 10.1063/1.3095758.
Stepanov et al., "Efficient generation of subpicosecond terahertz radiation by phase-matched optical rectification using ultrashort laser pulses with tilted pulse fronts", Applied Physics Letters, vol. 83, No. 15, Oct. 13, 2003, pp. 3000-3002, doi: 10.1063/1.1617371.
Stepanov et al., "Generation of 30 µJ single-cycle terahertz pulses at 100 Hz repetition rate by optical rectification", Optics Letters, vol. 33, No. 21, Nov. 1, 2008, pp. 2497-2499, doi: 10.1364/OL.33.002497.
Stepanov et al., "Scaling up the energy of THz pulses created by optical rectification", Optics Express, vol. 13, No. 15, Jul. 25, 2005, pp. 5762-5768, doi: 10.1364/OPEX.13.005762.
Stevens et al., "Global health risks: progress and challenges", Bulletin of the World Health Organization, vol. 87, No. 9, Sep. 2009, 3 pgs., doi: 10.2471/BLT.09.070565.
Sukhotin et al., "Photomixing and photoconductor measurements on ErAs/InGaAs at 1.55 µm", Applied Physics Letters, vol. 82, No. 18, May 5, 2003, pp. 3116-3118, doi: 10.1063/1.1567459.
Sun et al., "Room temperature GaN/AlGaN self-mixing terahertz detector enhanced by resonant antennas", Applied Physics Letters, vol. 98, No. 25, Jun. 20, 2011, pp. 252103-1-252103-3, doi: 10.1063/1.3601489.
Suyatin et al., "Strong Schottky barrier reduction at Au-catalyst/GaAs-nanowire interfaces by electric dipole formation and Fermi-level unpinning", Nature Communications, vol. 5, No. 3221, Feb. 3, 2014, pp. 1-8, doi: 10.1038/ncomms4221.
Suzuki et al., "Fe-implanted InGaAs terahertz emitters for 1.56 µm wavelength excitation", Applied Physics Letters, vol. 86, Jan. 27, 2005, pp. 051104_1-051104_3, doi: 10.1063/1.1861495.
Takayanagi et al., "High-resolution time-of-flight terahertz tomography using a femtosecond fiber laser", Optics Express, vol. 17, No. 9, Apr. 27, 2009, pp. 7549-7555, doi: 10.1364/OE.17.007533.
Takazato et al., "Detection of terahertz waves using low-temperature-grown InGaAs with 1.56 µm pulse excitation", Applied Physics Letters, vol. 90, Mar. 9, 2007, pp. 101119_1-1011119_3, doi: 10.1063/1.2712503.
Tangring et al., "A study of the doping influence on strain relaxation of graded composition InGaAs layers grown by molecular beam epitaxy", Journal of Crystal Growth, vol. 311, No. 7, Mar. 2009, pp. 1684-1687, doi: 10.1016/j.jcrysgro.2008.11.019.
Tani et al., "Detection of terahertz radiation with low-temperature-grown GaAs-based photoconductive antenna using 1.55 mm probe", Applied Physics Letters, vol. 77, No. 9, Aug. 28, 2000, pp. 1396-1398, doi: 10.1063/1.1289914.
Tanigawa et al., "Enhanced Responsivity in a Novel AlGaN/GaN Plasmon-Resonant Terahertz Detector Using Gate-Dipole Antenna with Parasitic Elements", 68th Device Research Conference, Jun. 21, 2010, pp. 167-168, doi: 10.1109/DRC.2010.5551895.
Tanoto et al., "Nano-antenna in a photoconductive photomixer for highly efficient continuous wave terahertz emission", Scientific Reports, vol. 3, No. 2824, Oct. 8, 2013, 6 pgs., doi: 10.1038/srep02824.
Taylor et al., "Resonant-optical-cavity photoconductive switch with 0.5% conversion efficiency and 1.0W peak power", Optics Letters, vol. 31, No. 11, Jun. 1, 2006, pp. 1729-1731, doi: 10.1364/ol.31.001729.
Teitel et al., "Ballistic transport and velocity overshoot in semiconductors: Part I—Uniform field effects", IEEE Transactions on Electron Devices, vol. 30, No. 2, Feb. 1983, pp. 150-153, doi: 10.1109/T-ED.1983.21088.
Tersoff, "Schottky barriers and semiconductor band structures", Physical Review B, vol. 32, No. 10, Nov. 15, 1985, pp. 6968-6971, doi: 10.1103/PhysRevB.32.6968.
Tonouchi, "Cutting-edge terahertz technology", Nature Photonics, vol. 1, Feb. 2007, pp. 97-105, doi: 10.1038/nphoton.2007.3.
Tonouchi et al., "Simplified formulas for the generation of terahertz waves from semiconductor surfaces excited with a femtosecond laser", Journal of Applied Physics, vol. 127, Jun. 22, 2020, pp. 245703_1-245703_5, doi: 10.1063/5.0005623.
Tsuda et al., "Application of plasmon-resonant microchip emitters to broadband terahertz spectroscopic measurement", Journal of the Optical Society of America B, vol. 26, No. 9, Sep. 2009, pp. A52-A57, doi: 10.1364/JOSAB.26.000A52.
Turan et al., "0.4 mW Terahertz Power Generation Through Bias-Free, Telecommunication-Compatible, Photoconductive Nano-Antennas", International Conference on Infrared, Millimeter, and Terahertz Waves, Paris, France, Sep. 1-6, 2019, pp. 1-2, doi: 10.1109/IRMMW-THz.2019.8874319.
Turan et al., "High-Power Terahertz Generation from Bias-Free, Telecommunication-Compatible Photoconductive Nanoantennas", IEEE Microwave Symposium Digest, Boston, MA, Jun. 2-7, 2019, pp. 770-773, doi: 10.1109/MWSYM.2019.8701036.
Turan et al., "High-Power Terahertz Generation from Telecommunication-Compatible, Bias-Free Photoconductive Nano-Antennas", International Conference on Infrared, Millimeter, and Terahertz Waves, Nagoya, Japan, Sep. 9-14, 2018, pp. 1-2, doi: 10.1109/IRMMW-THz.2018.8510204.
Turan et al., "Impact of the Metal Adhesion Layer on the Radiation Power of Plasmonic Photoconductive Terahertz Sources", Journal of Infrared, Millimeter, and Terahertz Waves, vol. 38, Aug. 28, 2017, pp. 1448-1456, doi: 10.1007/s10762-017-0431-9.
Turan et al., "Wavelength conversion through plasmon-coupled surface states", Nature Communications, vol. 12, No. 4641, Jul. 30, 2021, 8 pgs., doi: 10.1038/s41467-021-24957-1.
Ueno et al., "Quantitative Measurements of Amino Acids by Terahertz Time-Domain Transmission Spectroscopy", Analytical Chemistry, vol. 78, No. 15, Aug. 1, 2006, pp. 5424-5428, doi: 10.1021/ac060520y.
Unknown Author, "Guidance for Industry: Action levels for Poisonous or Deleterious Substances in Human food and Animal Feed", Food and Drug Administration, Aug. 2000, 18 pgs.
Unknown Author, "IARC Monographs on the Evaluation of Carcinogenic Risks to Humans: Re-Evaluation of Some Organic Chemicals, Hydrazine and Hydrogen Peroxide", World Health Organization, International Agency for Research on Cancer, vol. 71, 1999, 1597 pgs., (Presented in 3 parts).
Unknown Author, "Xilinx and Altera FPGA Integration Modules", Opal Kelly, Apr. 2023, Retrieved from the Internet <https://www.opalkelly.com/>, 9 pgs.
Verghese et al., "Generation and detection of coherent terahertz waves using two photomixers", Applied Physics Letters, vol. 73, No. 26, Dec. 28, 1998, pp. 3824-3826, doi: 10.1063/1.122906.
Vicario et al., "Generation of 0.9-mJ THz pulses in DSTMS pumped by a Cr:Mg$_2$SiO$_4$ laser", Optics Letters, vol. 39, No. 23, Dec. 1, 2014, pp. 6632-6635, doi: 10.1364/OL.39.006632.
Wacoo et al., "Methods for Detection of Aflatoxins in Agricultural Food Crops", Journal of Applied Chemistry, vol. 2014, No. 706291, Nov. 13, 2014, pp. 15 pgs., doi: 10.1155/2014/706291.
Wallace et al., "Terahertz Pulsed Imaging and Spectroscopy for Biomedical and Pharmaceutical Applications", Faraday Discussions, vol. 126, 2004, pp. 255-263, doi: 10.1039/b309357n.
Wallace et al., "Three-Dimensional Imaging of Optically Opaque Materials Using Nonionizing Terahertz Radiation", Journal of the Optical Society of America A, vol. 25, No. 12, Dec. 2008, pp. 3120-3133, doi: 10.1364/JOSAA.25.003120.
Wang et al., "Noise Analysis of Photoconductive Terahertz Detectors", Journal of Infrared, Millimeter, and Terahertz Waves, vol. 34, Jul. 11, 2013, pp. 519-528, doi: 10.1007/s10762-013-9995-1.
Wang et al., "Plasmonic photoconductive detectors for enhanced terahertz detection sensitivity", Optics Express, vol. 21, No. 14, Jul. 2015, pp. 17221-17227, doi: 10.1364/OE.21.017221.
Wang et al., "Room temperature heterodyne terahertz detection with quantum-level sensitivity", Nature Astronomy, vol. 3, Jul. 2019, pp. 977-982, doi: 10.1038/s41550-019-0828-6.

(56) References Cited

OTHER PUBLICATIONS

Wang et al., "Terahertz Imaging Applications in Agriculture and Food Engineering: a Review", Transactions of the ASABE, vol. 61, No. 2, 2018, pp. 411-424, doi: 10.13031/trans.12201.

Williams et al., "Human Aflatoxicosis in Developing Countries: a Review of Toxicology, Exposure, Potential Health Consequences, and Interventions", The American Journal of Clinical Nutrition, vol. 80, No. 5, Nov. 2004, pp. 1106-1122, doi: 10.1093/ajcn/80.5.1106.

Wu et al., "Highly efficient generation of 0.2 mJ terahertz pulses in lithium niobate at room temperature with sub-50 fs chirped Ti:sapphire laser pulses", Optics Express, vol. 26, No. 6, Mar. 19, 2018, pp. 7107-7116, doi: 10.1364/OE.26.007107.

Yang et al., "7.5% Optical-to-Terahertz Conversion Efficiency Offered by Photoconductive Emitters with Three-Dimensional Plasmonic Contact Electrodes", IEEE Transactions on Terahertz Science and Technology, vol. 4, No. 5, Sep. 2014, pp. 575-581, doi: 10.1109/TTHZ.2014.2342505.

Yang et al., "Enhanced Light-Matter Interaction at Nanoscale by Utilizing High-Aspect-Ratio Metallic Gratings", Optics Letters, vol. 38, No. 18, Sep. 15, 2013, pp. 3677-3679, doi: 10.1364/OL.38.003677.

Yang et al., "Frequency-Tunable Continuous-Wave Terahertz Sources Based on GaAs Plasmonic Photomixers", Applied Physics Letters, vol. 107, Sep. 30, 2015, pp. 131111_1-131111_4, doi: 10.1063/1.4932114.

Yang et al., "Powerful and Tunable THz Emitters Based on the Fe/Pt Magnetic Heterostructure", Advanced Optical Materials, vol. 4, No. 12, 2016, pp. 1944-1949, doi; 10.1002/adom.201600270.

Yang et al., "Tunable terahertz wave generation through a bimodal laser diode and plasmonic photomixer", Optics Express, vol. 23, No. 24, Nov. 30, 2015, pp. 31206-31215, doi: 10.1364/OE.23.031206.

Yardimci et al., "A High-Power Broadband Terahertz Source Enabled by Three-Dimensional Light Confinement in a Plasomic Nanocavity", Scientific Reports, vol. 7, No. 4166, Jun. 23, 2017, pp. 1-8, doi: 10.1038/s41598-017-04553-4.

Yardimci et al., "A High-Responsivity and Broadband Photoconductive Terahertz Detector Based on a Plasmonic Nanocavity", Applied Physics Letters, vol. 113, Dec. 18, 2018, pp. 251102-1-251102-4, doi: 10.1063/1.5066243.

Yardimci et al., "High power telecommunication-compatible photoconductive terahertz emitters based on plasmonic nano-antenna arrays", Applied Physics Letters, vol. 109, Nov. 9, 2016, pp. 191103_1-191103_4, doi: 10.1063/1.4967440.

Yardimci et al., "High Sensitivity Terahertz Detection through Large-Area Plasmonic NanoAntenna Arrays", Scientific Reports, vol. 7, No. 42667, Feb. 16, 2017, pp. 1-8, doi: 10.1038/srep42667.

Yardimci et al., "High-Power Terahertz Generation Using Large-Area Plasmonic Photoconductive Emitters", IEEE Transactions on Terahertz Science and Technology, vol. 5, No. 2, Mar. 2015, pp. 223-229, doi: 10.1109/TTHZ.2015.2395417.

Yardimci et al., "Impact of substrate characteristics on performance of large area plasmonic photoconductive emitters", Optics Express, vol. 23, No. 25, Dec. 14, 2015, pp. 32035-32043, doi: 10.1364/OE.23.032035.

Yardimci et al., "Large Area Plasmonic Photoconductive Emitters for Generating High Power Broadband Terahertz Radiation", Frontiers in Optics, Tucson, Arizona United States, Oct. 19-23, 2014, 2 pgs., doi: 10.1364/FIO.2014.FTh3E.5.

Yardimci et al., "Nanostructure-Enhanced Photoconductive Terahertz Emission and Detection", Small, vol. 14, No. 44, Article No. 1802437, Aug. 28, 2018, 14 pgs., doi: 10.1002/smll.201802437.

Yardimci et al., "Plasmonics Enhanced Terahertz Radiation from Large Area Photoconductive Emitters", IEEE Photonics Conference, Oct. 2014, pp. 326-327, doi: 10.1109/IPCon.2014.6995376.

Yeh et al., "Generation of 10 µJ ultrashort THz pulses by optical rectification", Applied Physics Letters, vol. 90, Apr. 27, 2007, pp. 171121_1-171121_3, doi: 10.1063/1.2734374.

Yu et al., "The potential of terahertz imaging for cancer diagnosis: a review of investigations to date", Quantitative Imaging in Medicine and Surgery, vol. 2, No. 1, Mar. 2012, pp. 33-45, doi: 10.3978/j.issn.2223-4292.2012.01.04.

Zhang et al., "Simultaneous determination of amino acid mixtures in cereal by using terahertz time domain spectroscopy and chemometrics", Chemometrics and Intelligent Laboratory Systems, vol. 164, May 15, 2017, pp. 8-15, doi: 10.1016/j.chemolab.2017.03.001.

Zhao et al., "Design and performance of a THz emission and detection setup based on a semi-insulating GaAs emitter", Review of Scientific Instruments, vol. 73, No. 4, Apr. 2002, pp. 1715-1719, doi: 10.1063/1.1459095.

\* cited by examiner

SYSTEMS AND METHODS FOR WAVELENGTH CONVERSION THROUGH PLASMON-COUPLED SURFACE STATES

CROSS-REFERENCE TO RELATED APPLICATIONS

This application is a national stage of PCT Application No. PCT/US2021/072676, entitled "Systems and Methods for Wavelength Conversion through Plasmon-Coupled Surface States" filed Dec. 1, 2021, which application claims the benefit of and priority to U.S. Provisional Patent Application No. 63/120,066 entitled "Wavelength Conversion Through Plasmon-coupled Surface States" filed Dec. 1, 2020, and U.S. Provisional Application No. 63/264,644 entitled "Wavelength Conversion Through Plasmon-coupled Surface States" filed Nov. 29, 2021, the disclosures of which are hereby incorporated by references in their entirety.

STATEMENT OF FEDERALLY SPONSORED RESEARCH

This invention was made with government support under DE-SC0016925, awarded by the U.S. Department of Energy and Grant Number N000141912052, awarded by the U.S. Navy, Office of Naval Research. The government has certain rights in the invention.

FIELD OF THE INVENTION

The present invention generally relates to systems and methods for optical wavelength conversion to different parts of the electromagnetic spectrum; and more particularly to systems and methods for optical wavelength conversion to any of a number of regions of the electromagnetic spectrum ranging from microwave to infrared regimes through plasmon-coupled surface states.

BACKGROUND

The terahertz regime of the electromagnetic spectrum has uniquely attractive qualities, for example generating high-resolution images and transferring large scale data rapidly. However, high power input and low conversion efficiency of terahertz sources remains one of the challenges of exploiting terahertz applications. Building a terahertz source that has minimal power input and high conversion efficiency may broaden potential applications of terahertz technology.

BRIEF SUMMARY OF THE INVENTION

Apparatus and systems for optical wavelength conversion to portions of the electromagnetic spectrum ranging from microwave to infrared regimes through plasmon-coupled surface states are illustrated.

One embodiment of the invention includes a wavelength conversion device comprising at least one semiconductor substrate, and at least one conductive layer; where the semiconductor substrate comprises at least one region that has a built-in electric field; where the conductive layer comprises at least one electrode with at least one optical subwavelength dimension; and where the at least one electrode is capable of bending incident optical light to couple with the at least one region that has the built-in electric field to convert the optical wavelength to a different wavelength of the electromagnetic spectrum.

In another embodiment, the built-in electric field is generated by a source selected from the group consisting of: at least one semiconductor surface state, a Schottky contact, and a semiconductor heterostructure.

A further embodiment includes at least one antenna.

In still another embodiment, the at least one electrode converts the optical wavelength ranging from 300 nm to 2 microns to a wavelength ranging from 100 GHz to 10 THz.

In a yet further embodiment, the wavelength conversion device does not have an external electrical power source.

In a still further embodiment, the at least one electrode has a structure selected from the group consisting of circular, rectangular, triangular, cross, bow ties, H-shape, and C-shape.

In yet another embodiment, the at least one electrode is a subwavelength grating.

In a further embodiment again, the at least one semiconductor substrate comprises silicon, germanium, or an alloy, wherein at least one element of the alloy is selected from the group consisting of indium, aluminum, gallium, arsenic, antimony, phosphorus, silicon, and germanium.

In a further additional embodiment, the at least one semiconductor substrate comprises an intrinsic semiconductor layer and a doped semiconductor layer with a doping density ranging from about 1016 cm$^{-3}$ to about 1019 cm$^{-3}$, wherein the semiconductor layer is p-type doped or n-type doped.

In a still yet further embodiment, the at least one semiconductor substrate comprises an alloy with a graded composition.

In another additional embodiment, the at least one conductive layer comprises a material selected from the group consisting of a metal, a high-conductivity semiconductor, and a 2D material.

In a still yet further embodiment, the 2D material is graphene.

In still yet another embodiment, the optical light is a femtosecond optical pulse train or a heterodyning optical beam with a beat frequency ranging from 100 GHz to 10 THz.

Another additional embodiment includes at least one electrical insulator layer, where the at least one electrical insulator layer is interposed between the at least one semiconductor substrate and the at least one conductive layer such that only a portion of the at least one electrode directly contacts the at least one semiconductor substrate.

In a further embodiment again, the at least one electrical insulator layer comprises a material selected from the group consisting of silicon dioxide, silicon nitride, and sapphire.

In still another embodiment again, at least one-tenth of the at least one electrode directly contacts the at least one semiconductor substrate.

A still further additional embodiment includes an optical reflector layer, where the optical reflector layer is embedded in the at least one semiconductor substrate.

In still another additional embodiment, the optical reflector layer is selected from the group consisting of: a distributed Bragg reflector (DBR), and a metal layer configured to enhance wavelength conversion efficiency.

In a yet further embodiment again, the at least one semiconductor substrate is patterned.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE DRAWINGS

Figure 1A:
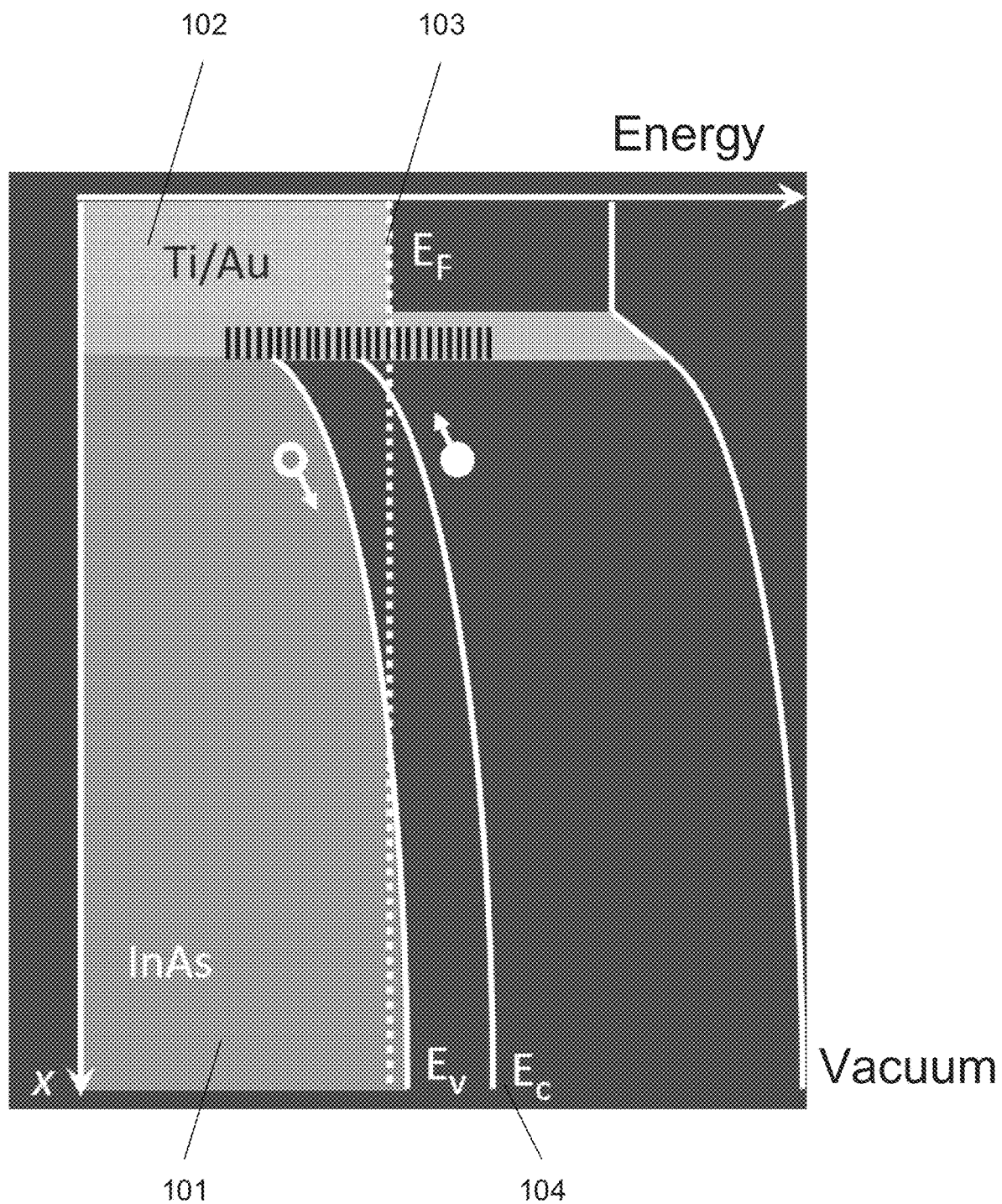
FIGS. 1A and 1B illustrate energy band bending caused by InAs surface states in accordance with an embodiment of the invention.

Turning now to the drawings, systems and methods for performing optical wavelength conversion to regions within the electromagnetic spectrum ranging from microwave to infrared regimes through plasmon-coupled surface states are described. Many embodiments harness the built-in electric field of semiconductor devices to enable passive wavelength conversion. The built-in electric field in accordance with several embodiments can be generated via semiconductor surface states, Schottky contacts, and/or semiconductor heterostructures. By utilizing the built-in electric field generated within semiconductor devices, many embodiments can reduce or exclude the use of external applied bias and/or any nonlinear optical phenomena in optical wavelength conversion. Surface states can degrade semiconductor device performance by raising the charge injection barrier height, introducing localized trap states, inducing surface leakage current, and/or altering electric potential. There has been a continuing effort to use various surface passivation treatments to suppress the undesirable impacts of surface states. Several embodiments utilize the natural band-bending the can occur at the surface of semiconductors to induce an electric field that can be utilized in the generation of terahertz radiation. Several embodiments implement photo-excited surface plasmons coupling to the surface states to generate an electron gas. In some embodiments, the electron gas can be routed to nanoantenna arrays through the electric field created by the surface states. The induced current on the nanoantennas, which contains the mixing product of different optical frequency components, can generate radiation at the beat frequencies of the incident photons. In some embodiments, plasmonic nanoantennas can be utilized for efficient coupling of optical pump beams to the semiconductor surface areas with the largest built-in electric field.

Many embodiments provide improved efficiency in converting optical wavelengths to terahertz wavelengths via plasmon-coupled surface states. Several embodiments provide various methods to boost the built-in electric field. Some embodiments provide stronger overlap between the built-in electric field and optical plasmons. Many embodiments extend from pulsed terahertz generation to continuous-wave terahertz generation with tunable frequency.

Nonlinear optical materials are known means for passive wavelength conversion, enabling technologies such as optical sources, processors, sensors, imaging, and quantum optical systems. Many embodiments provide passive wavelength conversion systems with orders of magnitude higher efficiencies compared to nonlinear optical processes by utilizing the naturally induced built-in electric field in semiconductor surface states. The enhancement in wavelength conversion efficiency combined with the physical attributes of plasmon-coupled surface states may enable functionalities that may not be offered by nonlinear optical processes. Unlike nonlinear optical processes, wavelength conversion through plasmon-coupled surface states in accordance with several embodiments may not be restricted by the Manley-Rowe limit, enabling access to new parts of the electromagnetic spectrum including (but not limited to) millimeter-wave, microwave, and radio frequencies, that may not be accessible through nonlinear optical processes.

In many embodiments, wavelength conversion via plasmon-coupled surface states can be used for optical wavelength (wavelength ranging from about 300 nm to about 2 microns) conversion to different parts of the electromagnetic spectrum ranging from microwave to infrared regimes in both pulsed and continuous wave operation. Several embodiments show optical wavelength conversion to different parts of the electromagnetic spectrum by using appropriate optical beat frequencies. Many embodiments implement plasmon-coupled surface states to demonstrate passive wavelength conversion in the terahertz regime of the electromagnetic spectrum, where frequencies can range from about 100 GHz to about 10 THz, or wavelengths from about 3 millimeters to about 30 micrometers.

In some embodiments, optical wavelengths can be converted to terahertz wavelengths using arrays of metallic nanostructures serving as terahertz radiating elements. Arrays of metallic nanostructures can be in a large area and/or a small area. In certain embodiments, terahertz conversion can be implemented through arrays of metallic nanostructures connected to antennas. Antennas including (but not limited to) bow-tie, spiral, and/or dipole, can serve as radiating elements in accordance with several embodiments. Arrays of metallic nanostructures can be scaled to adapt to different antenna types as appropriate to the requirements of specific applications.

Several embodiments provide that plasmon-coupled surface states can allow passive wavelength conversion through materials that do not support many of the nonlinear optical processes. Semiconductor lattices that possess axial symmetry (e.g. silicon and germanium) typically cannot provide second-order nonlinearity. However, wavelength conversion in these materials is possible by the use of plasmon-coupled surface states, enabling applications in sensing, imaging, communication, and computation platforms compatible with integrated circuit technologies. In a number of embodiments, wavelength conversion devices include at least one semiconductor layer in the substrate, and at least one conductive layer of plasmonic electrodes formed on a surface of the substrate. Some embodiments implement intrinsic, p-type doped, and/or n-type doped semiconductors in the semiconductor layer. Examples of semiconductor layers include (but are not limited to) silicon, germanium, or an alloy comprising indium, aluminum, gallium, arsenic, antimony, phosphorus, silicon, germanium, and any combinations thereof. In several embodiments, SiGe alloy can be used in the semiconductor layers. Certain embodiments provide that the semiconductor substrate can be patterned via a method including (but not limited to) etching. In several embodiments, the conductive layers can include (but are not limited to) metal layers, highly conductive semiconductor layers, and 2D material layers such as graphene. As can readily be appreciated, any of a variety of material compositions can be incorporated as appropriate to the requirements of specific applications in accordance with various embodiments of the invention. Some embodiments can include a light source including (but not limited to) a laser, a temporal shape laser, optical frequency combs, and/or an optical fiber. Wavelength conversion devices in accordance with many embodiments of the invention can be readily attached to a light source by applying an adhesive material including (but not limited to) glue in accordance with certain embodiments. A wide range of optical wavelength sources can be adapted for use in combination with wavelength conversion devices in accordance with various embodiments of the invention, enabling the use of low-cost telecommunication-compatible optical pump sources. Examples of optical light sources include (but are not limited to) a femtosecond optical pulse train or a heterodyning optical beam with a beat frequency varying between 100 GHz and 10 THz. As can readily be appreciated, any of a variety of optical light sources can be incorporated as appropriate to the requirements of specific applications in accordance with various embodiments of the invention.

Many embodiments provide improved efficiency in converting optical wavelengths to terahertz wavelengths via plasmon-coupled surface states. Several embodiments provide passive wavelength conversion of nanojoule optical pulses at a 1550 nm center wavelength to terahertz wavelengths with improved efficiencies. In some embodiments, the improved conversion efficiency in the terahertz regime may exceed nonlinear optical methods by at least 4-orders of magnitude.

Several embodiments provide that the built-in electric field of the wavelength conversion devices can be generated by semiconductor surface states, Schottky contacts, and/or semiconductor heterostructures. Wavelength conversion efficiency can be enhanced by boosting the built-in electric field at the semiconductor surface in accordance with some embodiments. In many embodiments, semiconductor structures with a graded composition can be used to introduce a steeper band-bending and produce stronger built-in electric field. Several embodiments incorporate a graded composition of semiconductor $In_{1-x}Ga_xAs$, with x increasing as a function of depth in the substrate, to introduce a steeper band-bending at the semiconductor surface. As can readily be appreciated, gradients can be incorporated with any of a variety of semiconductor materials as appropriate to the requirements of specific applications in accordance with various embodiments of the invention.

In several embodiments, conversion efficiency can be improved by increasing the spatial overlap between the built-in electric field and photoabsorption profiles. A number of embodiments implement various methods to further improve the terahertz conversion efficiency including (but not limited to): using semiconductors with a larger number of surface states above the conduction band, introducing higher p-type and/or n-type doping levels, and/or incorporating an intrinsic semiconductor layer between the doped semiconductor and the conductive layer. Adding a layer of undoped semiconductor between the doped semiconductor and the conductive layer can extend the band bending in the semiconductor substrate and hence increase the size of the built-in electric field in accordance with several embodiments.

Many embodiments provide an electrical insulating layer can be interposed between the semiconductor substrate and the conductive layer. Examples of the electrical insulating layer include (but are not limited to) silicon dioxide, silicon nitride, and sapphire. As can readily be appreciated, any of a variety of electrical insulators can be incorporated as appropriate to the requirements of specific applications in accordance with various embodiments of the invention. In several embodiments, the electrical insulating layer is interposed between the semiconductor substrate and the conductive layer such that only a portion of the conductive layer of an antenna element directly contacts the semiconductor substrate. In a number of embodiments, the electrical insulating layer is formed so that at least one-tenth of the conductive layer of an antenna element directly contacts the semiconductor substrate. In certain embodiments, the electrical insulating layer is formed so that less than three-quarters of the conductive layer of an antenna element directly contacts the semiconductor substrate, less than two-thirds of the conductive layer of an antenna element directly contacts the semiconductor substrate, less than one half of the conductive layer of an antenna element directly contacts the semiconductor substrate, less than one-third of the conductive layer of an antenna element directly contacts the semiconductor substrate, less than one-quarter of the conductive layer of an antenna element directly contacts the semiconductor substrate, or some other fraction of the surface area of the semiconductor substrate. The electrical insulating layers in accordance with some embodiments can selectively guide the photocurrent to specific areas on the conductive layer (e.g. areas in which the electrical insulating layer directly contacts the semiconductor layer).

In many embodiments, optical reflector layers can be incorporated in the semiconductor substrate to improve the wavelength conversion efficiency. Examples of optical reflector layers include (but are not limited to) distributed Bragg reflectors, metal distributed Bragg reflectors, and metal layers. As can readily be appreciated, any of a variety of optical reflector layers can be incorporated as appropriate to the requirements of specific applications in accordance with various embodiments of the invention. In certain embodiments, by growing the semiconductor active layer on a distributed Bragg reflector and choosing an appropriate nanoantenna geometry, most of the excited surface plasmons can be trapped in the semiconductor active layer and, therefore, a much stronger spatial overlap between the built-in electric field and photoabsorption profiles can be achieved.

Several embodiments provide that plasmon-coupled surface states allow passive wavelength conversion using nanoantenna arrays. Using nanoantenna arrays in accordance with some embodiments can manipulate the spatial, spectral, and polarization state of the generated electromagnetic waves, which may not be possible by other passive wavelength conversion techniques such as nonlinear optical processes, spintronics, photo-Dember effect. Plasmonic electrodes with geometries that can excite surface plasmon waves may achieve optimal conversion efficiency. A number of embodiments are discussed below that explore the impact of geometry on nanoantenna array performance including (but not limited to): nanoantenna lengths, ground line width, the gap between the nanoantenna array rows, and/or periodicity of the nanoantenna on terahertz conversion efficiency. In several embodiments, current injection position within the nanoantenna arrays impacts the induced current on the nanoantenna arrays. For example, current that is injected near the nanoantenna tip and the nanoantenna-ground line intersection can provide the highest contribution to the total induced current on the nanoantennas. The nanoantenna geometries and semiconductor structures in accordance with many embodiments can be chosen to maximize the spatial overlap between the built-in electric field and photoabsorption profiles. As can readily be appreciated, a variety of nanoantenna geometries and injection positions can be utilized as appropriate to the requirements of specific applications in accordance with various embodiments of the invention.

Many embodiments exclude the use of an external power source for the wavelength conversion by utilizing the built-in electric field generated by the surface states of semiconductors. In several embodiments, wavelength conversion through plasmon-coupled surface states can achieve at least the same efficiency as devices that require external voltage supplies (for example, a voltage supply of about 120V DC). Exclusion or reduction of external voltage supplies can provide wavelength conversion devices in accordance with various embodiments of the invention with improved reliability, higher durability, longer lifetime, and/or convenience to deploy. In several embodiments, exclusion of external bias voltage can eliminate background current that could result in thermal breakdown, hence the wavelength conversion devices can achieve improved device reliability. Some embodiments eliminate many components that are used in conventional biased photoconductive terahertz sources such that wavelength conversion devices have reduced device sizes and price. The passive wavelength conversion devices in accordance with certain embodiments can simply be attached and/or glued to a position where wavelength conversion may be needed. Some embodiments provide that the nanoantenna chip can be coupled to optical fiber(s) by attaching to the tip of the fiber, which can be (for example) integrated with an endoscopy probe for in-vivo terahertz imaging and spectroscopy.

The enhancement in wavelength conversion efficiency offered by plasmon-coupled surface states in accordance with some embodiments of the invention can reduce the optical power budget, enabling operation in compact and miniaturized system platforms that may not be possible for nonlinear optical systems. To achieve the same terahertz power levels through nonlinear optical processes, at least 4-orders of magnitude higher optical power may be required, which may not be supported by optical fibers. Unlike the bulky and complex nonlinear optical setups that require high-energy lasers, tight optical focus, and/or tilted beam to provide high optical pump intensity and phase matching for efficient wavelength conversion, wavelength conversion through plasmon-coupled surface states may not need a complex optical setup and may not be sensitive to optical focus and alignment, extending the scope of its potential use for many practical applications. Wavelength conversion devices in accordance with various embodiments of the invention are discussed further below.

Surface States in Semiconductors

When a semiconductor lattice is terminated on a surface, the periodicity of the lattice is typically broken since the surface atoms do not have a sufficient number of atoms that they can bond to, leaving behind incomplete chemical bonds. These so called dangling bonds can produce localized surface states with energy levels that are typically located within the bandgap of the semiconductor. The Fermi energy level at the surface of a semiconductor is fixed to the energy level at which the surface state density peaks, while the Fermi energy level away from the semiconductor surface can be determined by the semiconductor doping. Therefore, the presence of surface states can take away an important degree of freedom for engineering semiconductor devices by altering the electric potential profile. As such, surface states are typically regarded to be a source of degradation in semiconductor devices.

Despite continuous efforts to suppress surface semiconductor states, they have unique electrochemical properties that may not be provided by bulk semiconductors and could enable unprecedented device functionalities. The presence of surface states can induce a built-in electric field at the surface of a doped semiconductor including (but not limited to) InAs. The built-in electric field generated by the surface states exceeds the breakdown field of bulk InAs. The energy level at which the surface state density of InAs peaks is located above its direct bandgap because there is a large difference between the direct and indirect bandgap energies of InAs. Since the electrons that occupy the surface states have an average total energy higher than the bulk InAs, they can migrate from the surface states to the bulk InAs to reach equilibrium, leaving behind immobile charge of uncompensated donor ions, which may produce a built-in electric field. Wavelength conversion ideally can be achieved by accelerating photoabsorbed charges through this built-in electric field with very high mobility. However, efficient wavelength conversion has typically not be possible previously due to shallow band bending at the surface of the semiconductor, which can limit the interaction between the built-in electric field and optical beam. Instead, the photo-Dember effect and nonlinear optical processes may be dominant mechanisms for passive wavelength conversion. (See, e.g., Adomavičius, R., et al., *Appl. Phys. Lett.* 85, 2463 (2004); Johnston, M. B., et al., *Phys. Rev. B* 65, 165301 (2002); Liu, K., et al., *Phys. Rev. B* 73, 155330 (2006); Tonouchi, M., et al., *J. Appl. Phys.* 127, 245703 (2020); the disclosures of which are incorporated herein by references in their entireties.)

The manner in which the presence of surface states can induce a built-in electric field at the surface of a p-doped InAs semiconductor in accordance with an embodiment of the invention is illustrated in FIG. 1A. FIG. 1A illustrates the energy band diagram of a highly p-doped InAs substrate (101) in contact with a metallic Au contact with a Ti adhesive layer (102). The energy level at which the surface state density of InAs peaks is located above its direct bandgap because there is a large difference between the direct (about 0.36 eV) and indirect bandgap energies (about 1.21 eV) of InAs. Electrons in these surface states can recombine with the holes in the valence band and occupy a part of the conduction band to minimize their total energy. As a result, the Fermi energy level (EF, 103) can be pinned above the conduction band minimum energy level (Ec, 104). Free electrons in the conduction band can migrate to the p-doped InAs layer to minimize their energy further, resulting in a steep band bending and a built-in electric field induced at the InAs surface.

While much of the discussion herein relates to the creation of build-in electric fields in semiconductors using surface states, built-in electric fields in semiconductors can be generated using other mechanisms including (but not limited to) Schottky contacts, and semiconductor heterostructures. As can readily be appreciated, any mechanism that can be utilized to establish a built-in electric field in a semiconductor can be utilized to perform optical wavelength conversion in accordance with various embodiments of the invention.

Figure 1B:
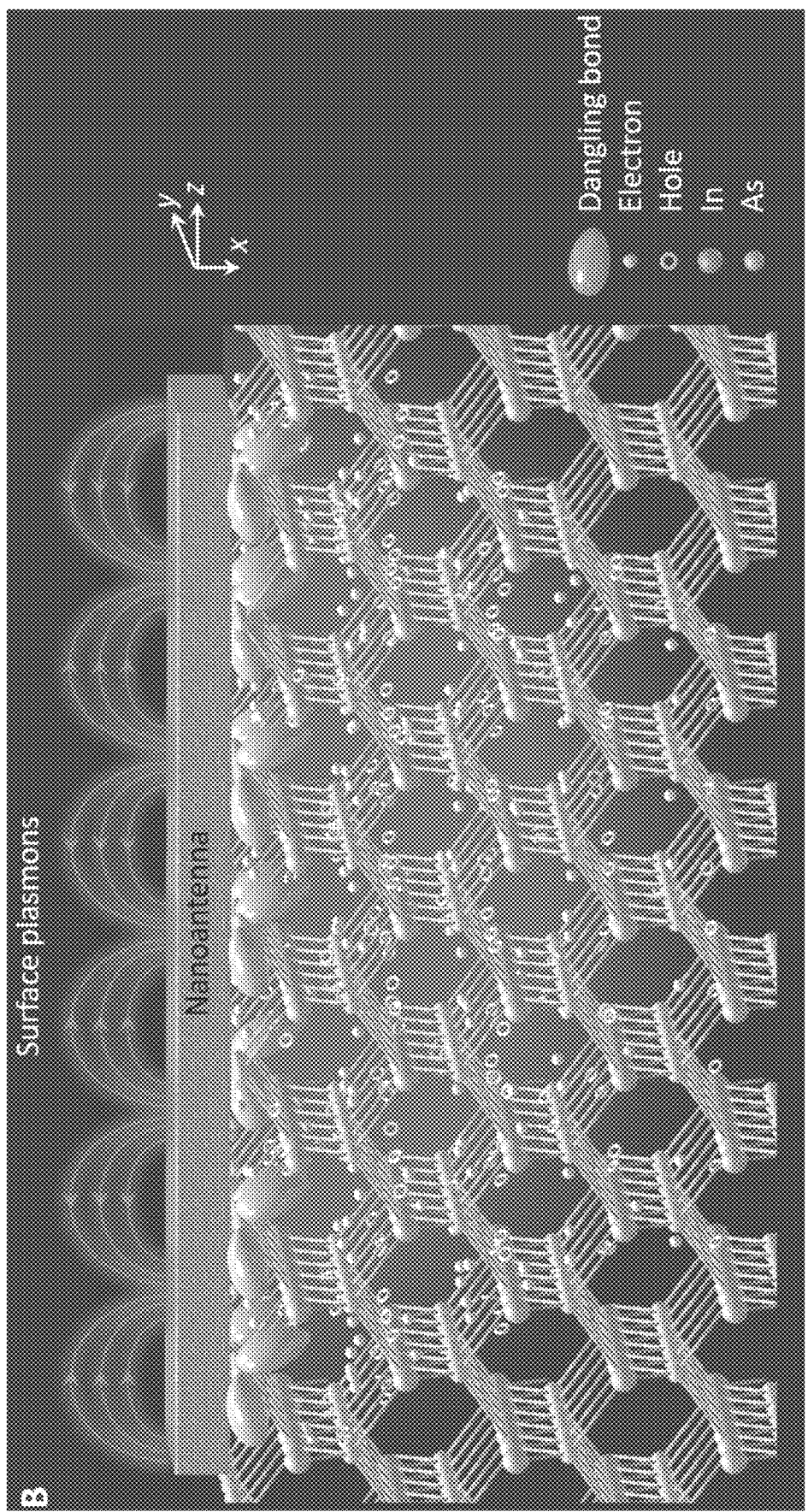

To effectively utilize this built-in electric field for optical wavelength conversion, many embodiments utilize optical photon exciting nanoantenna arrays to couple photo-excited surface plasmons to the surface states. An InAs lattice in contact with a nanoantenna that couples photo-excited surface plasmons to surface states in accordance with an embodiment of the invention is illustrated in FIG. 1B. Excitation of surface plasmons may enhance the optical intensity and photoabsorption near the InAs surface, where the strength of the built-in electric field can be maximized. The absorbed photons can generate a tightly confined electron gas under the nanoantenna contacts with an electron concentration that resonates at the mixing product of different optical frequency components. This electron gas can swiftly drift to the nanoantennas through the built-in electric field. The induced current on the nanoantennas can generate radiation at the beat frequencies of the optical photons.

While various systems of surface states in semiconductors are described above with reference to FIGS. 1A and 1B, any variety of surface states in semiconductors can be utilized in the generation of built-in electric fields as appropriate to the requirements of specific applications in accordance with various embodiments of the invention.

Passive Wavelength Conversion through Plasmon-Coupled Surface States

In many embodiments, wavelength conversion devices include at least one semiconductor layer in the substrate, and at least one conductive contact layer of plasmonic electrodes formed on a surface of the substrate. Some embodiments implement intrinsic, p-type doped, and/or n-type doped semiconductors in the semiconductor substrate. Examples of semiconductors in the substrate include (but are not limited to) silicon, germanium, and semiconductor alloys. Semiconductor alloys can be made of indium, aluminum, gallium, arsenic, antimony, phosphorus, silicon, germanium, and any combinations thereof. In a number of embodiments, the semiconductor substrates can be patterned with a plurality of features via a process including (but not limited to) etching.

In many embodiments, plasmonic electrodes can bend light to couple with surface states in the semiconductor layers. In several embodiments, plasmonic electrodes can couple with surface states with maximum band bending. Certain embodiments provide that conductive contact layers can include a metal layer, a highly conductive semiconductor layer (a highly doped semiconductor layer that can behave like a conductor), or a 2D material layer including (but not limited to) graphene. Any metal can be used in the metal electrodes. Examples of metal contacts for plasmonic enhancement include (but are not limited to): gold and silver. Several embodiments deposit an adhesion layer between the semiconductor substrate and the metal electrodes. The adhesion layer can be a metal layer that enhances bonding between the substrate and the metal electrodes. Examples of adhesion layer materials include (but are not limited to) titanium and chromium. In some embodiments, plasmonic metal electrodes can be at least one nanoantenna array. Many embodiments implement various shapes of metallic nanostructures in nanoantenna array layers to provide a terahertz source. The nanostructures may have features including (but not limited to) nanoantenna length smaller than the input optical wavelength. In certain embodiments, the nanostructures have features with at least one dimension of less than 400 nm. In a number of embodiments, the nanostructures have features with at least one dimension of less than 200 nm. Some embodiments utilize subwavelength gratings as metallic nanostructures. Several embodiments use subwavelength metallic nanostructures that can excite surface waves. Examples of different shapes of subwavelength metallic nanostructures include (but are not limited to) circular, rectangular, triangular, cross, bow tie, H-shape, and/or C-shape.

Figure 2A:
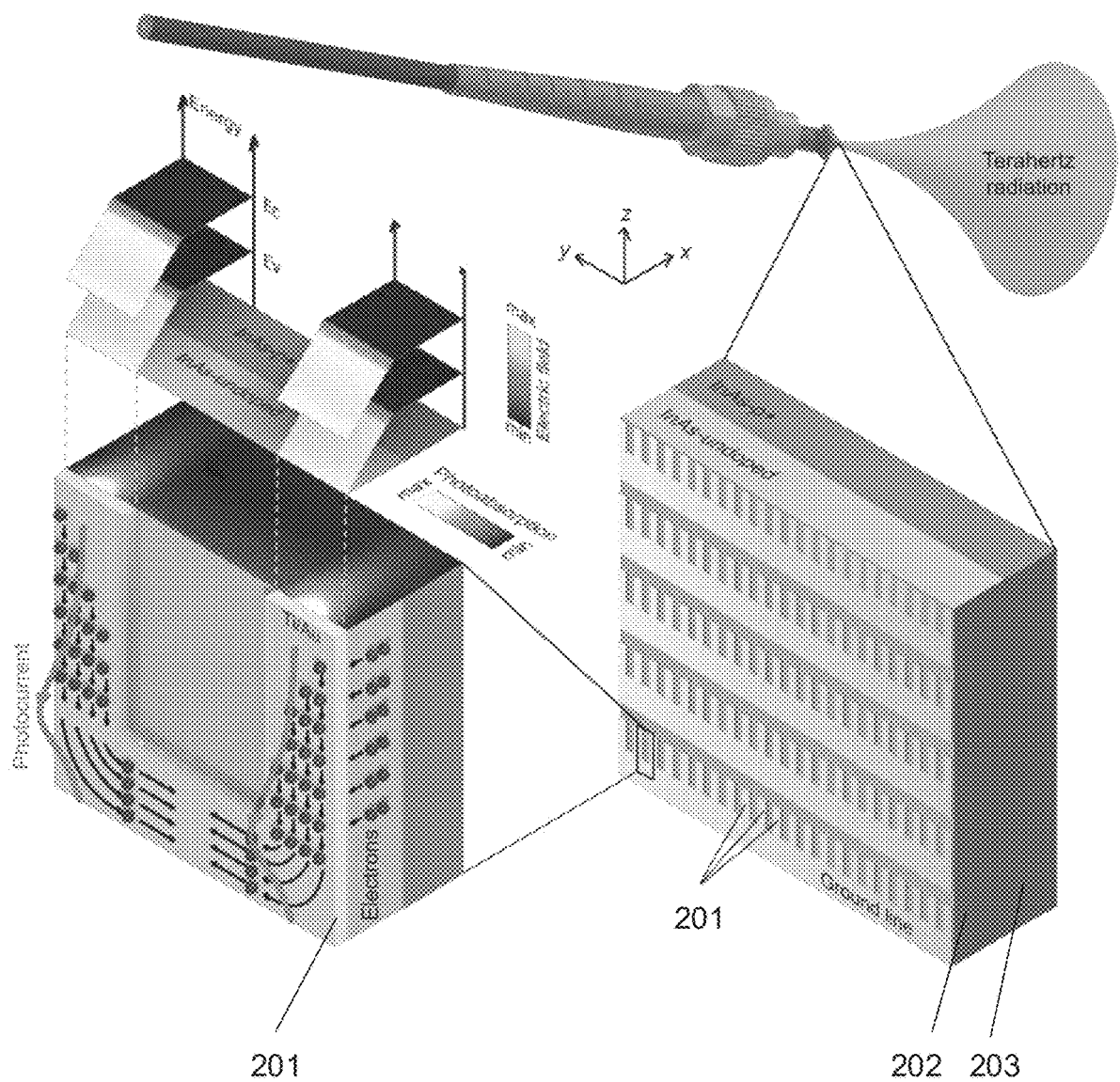
FIG. 2A illustrates a schematic of a nanoantenna array on an InAs semiconductor substrate in accordance with an embodiment of the invention.

A nanoantenna array capable of coupling photo-excited surface plasmons in accordance with an embodiment of the invention is illustrated in FIG. 2A. The nanoantenna array couples photo-excited surface plasmons to the InAs surface states where a built-in electric field can drift the photo-induced electron gas to the nanoantennas to generate radiation at the optical beat frequencies. Unlike bulky and complex nonlinear optical setups that may require high-energy lasers, tight optical focus, and/or tilted beam to provide high optical pump intensity and phase matching for efficient wavelength conversion, wavelength conversion through plasmon-coupled surface states typically does not require a complex optical setup and is not as sensitive to optical focus and alignment. FIG. 2A illustrates a nanoantenna array (201) on an InAs semiconductor substrate. The InAs semiconductor substrate can include a p-type doped InAs layer (203) and an undoped InAs layer (202). The InAs semiconductor substrate is designed to couple photo-excited surface plasmons to the surface states where a built-in electric field can drift the photo-induced electron gas to the nanoantennas (201) to generate radiation at the optical beat frequencies. The nanoantenna geometry and semiconductor structure can be chosen to maximize the spatial overlap between the built-in electric field and photoabsorption profiles.

Figure 2B:
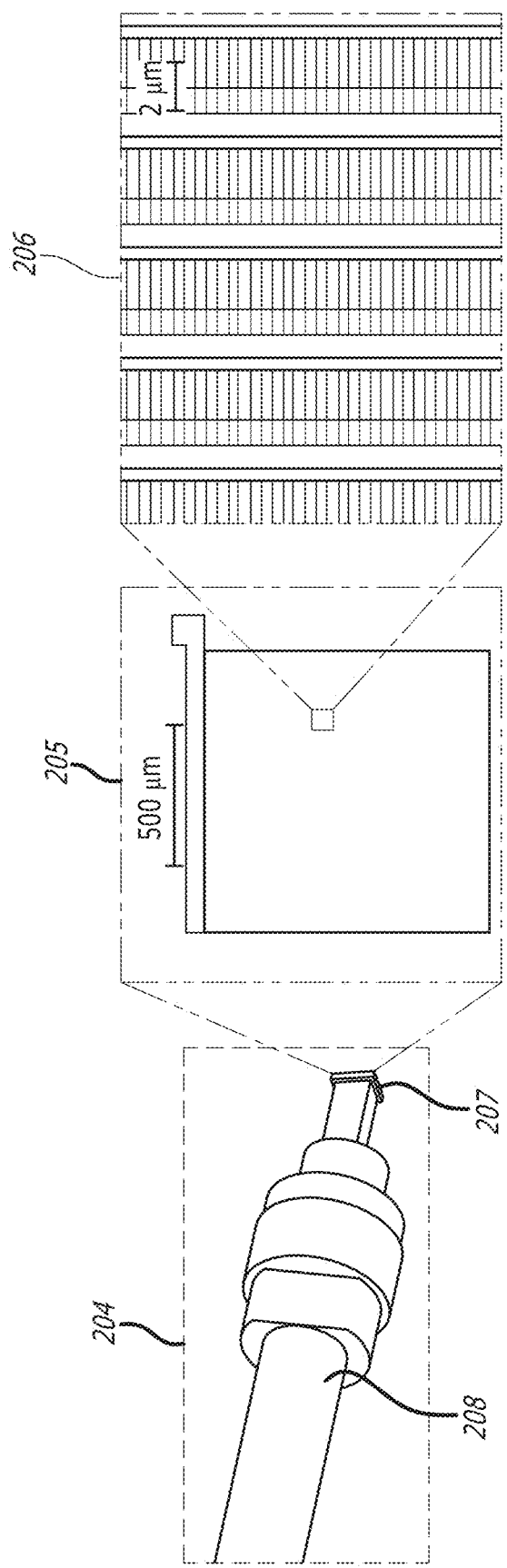
FIG. 2B illustrates photograph, microscopy, and scanning electron microscopy images of a fabricated nanoantenna array on a substrate in accordance with embodiments of the invention.

A nanoantenna array on InAs attached at the tip of an optical fiber in accordance with an embodiment of the invention is illustrated in FIG. 2B. The nanoantenna array on InAs substrate (207) can be glued at the tip of an optical fiber (208) without using any intermediate optical component and can be pumped by a compact fiber laser. FIG. 2B illustrates photograph (204), microscopy (205), and scanning electron microscopy (206) images of a fabricated nanoantenna array on a semiconductor substrate. The semiconductor substrate includes an approximately 100 nm thick undoped InAs layer grown on an approximately 500 nm thick InAs epilayer with a p-type doping of about $10^{19}$ $cm^{-3}$ grown on a semi-insulating GaAs substrate.

Figure 2C:
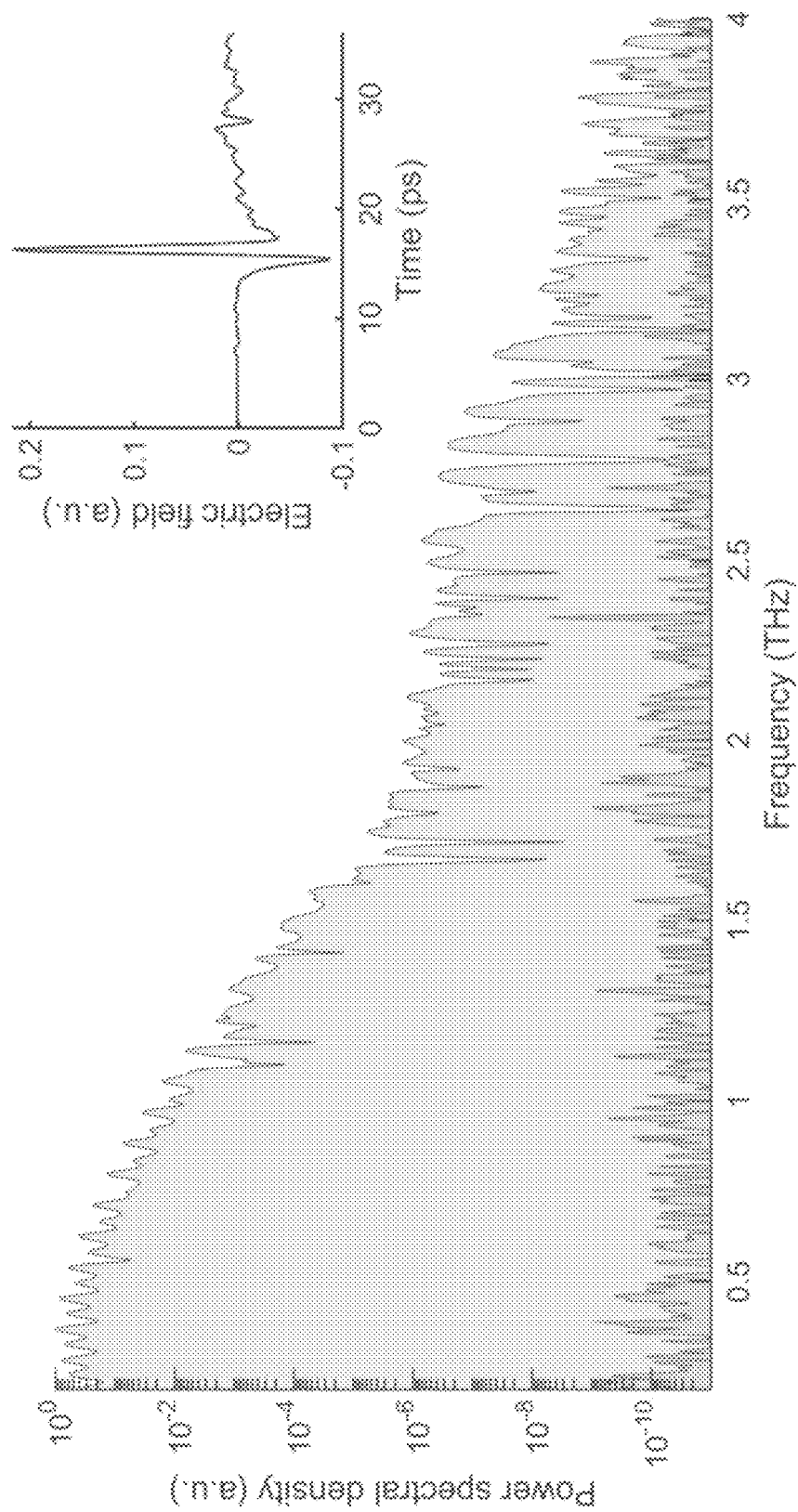
FIG. 2C illustrates terahertz radiation and noise spectra generated from the nanoantenna array in accordance with embodiments of the invention.

Terahertz radiation generated from the nanoantenna array in accordance with an embodiment of the invention is illustrated in FIG. 2C. FIG. 2C shows a conversion of about 3.68 nanojoule optical pulses with about 150 fs pulse-width coupled to the fiber at a 1550 nm center wavelength to about 1.78 picojoule terahertz pulses radiated from the nanoantenna array with more than a 4 THz bandwidth and 105 dB dynamic range. Broader radiation bandwidths exceeding 6 THz and higher dynamic ranges exceeding 110 dB can be achieved when using optical pulses with shorter pulse-width and higher power in accordance with several embodiments.

Figure 2D:
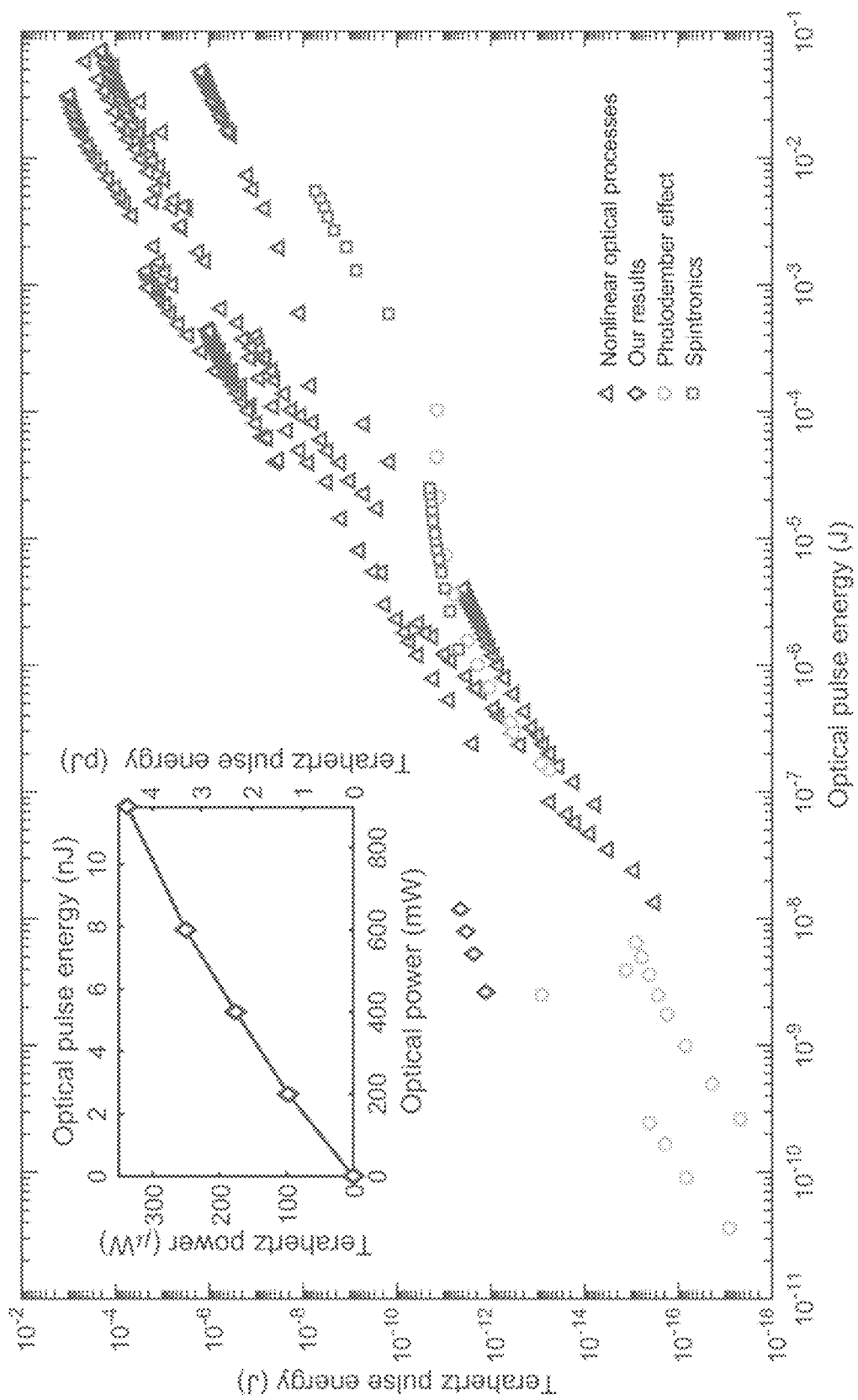
FIG. 2D illustrates terahertz pulse energy/power from a nanoantenna array implemented in accordance with an embodiment of the invention as a function of the optical pulse energy/power.

A comparison between terahertz pulse energy generation using nanoantenna arrays and other non-linear optical methods in accordance with an embodiment of the invention is illustrated in FIG. 2D. The measured terahertz pulse energy/power from the fabricated nanoantenna array as a function of the optical pulse energy/power (FIG. 2D inset) can be compared with other passive optical-to-terahertz converters, which utilize nonlinear optical processes, spintronics, and/or the photo-Dember effect. The comparison indicates a highest efficiency of the plasmon-coupled surface states in passive wavelength conversion of nanojoule optical pulses to terahertz regime with efficiencies that exceed nonlinear optical methods by at least 4-orders of magnitude.

Figure 3:
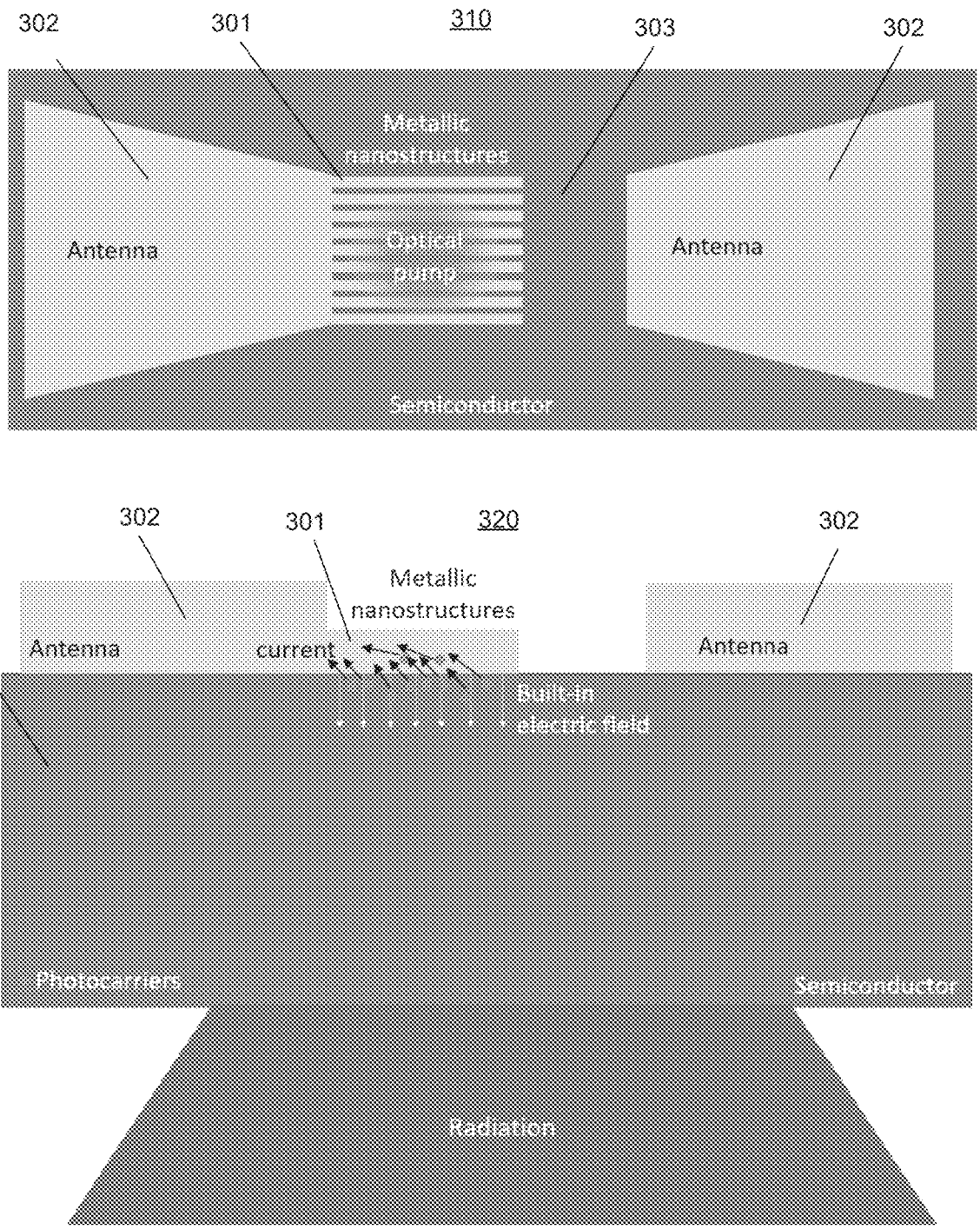
FIG. 3 illustrates a nanoantenna array formed on a semiconductor substrate connecting to antennas in accordance with an embodiment of the invention.

In many embodiments, terahertz conversion can be implemented through an array of metallic nanostructures connected to an antenna. A nanoantenna array formed on a semiconductor substrate connecting to antennas in accordance with an embodiment is illustrated in FIG. 3. A top view 310 and a side view of the nanoantenna array are shown. In the illustrated embodiment, nanoantenna arrays 301 are formed on a semiconductor substrate 303, which is designed to couple photo-excited surface plasmons to the surface states where a built-in electric field drifts the photo-induced electron gas to the nanoantennas to generate radiation at the optical beat frequencies. Antennas 302 can be connected to the metallic nanostructures for terahertz conversion.

Many embodiments provide electrical insulating layer(s) including (but not limited to) silicon dioxide, silicon nitride, and sapphire, can be deposited between the semiconductor substrate and the conductive layer. In several embodiments, the electrical insulating layer is interposed between the semiconductor substrate and the conductive layer such that only a portion of the conductive layer of an antenna element directly contacts the semiconductor substrate. In a number of embodiments, the electrical insulating layer is formed so that at least one-tenth of the conductive layer of an antenna element directly contacts the semiconductor substrate. In certain embodiments, the electrical insulating layer is formed so that less than three-quarters of the conductive layer of an antenna element directly contacts the semiconductor substrate, less than two-thirds of the conductive layer of an antenna element directly contacts the semiconductor substrate, less than one half of the conductive layer of an antenna element directly contacts the semiconductor substrate, less than one-third of the conductive layer of an antenna element directly contacts the semiconductor substrate, less than one-quarter of the conductive layer of an antenna element directly contacts the semiconductor substrate or some other fraction of the surface area of the semiconductor substrate. The electrical insulating layers in accordance with some embodiments can selectively guide the photocurrent to specific areas on the conductive layer (e.g. areas in which the electrical insulating layer directly contacts the semiconductor layer). Several embodiments provide that the semiconductor substrate can be patterned to have a plurality of features via a process including (but not limited to) etching.

Figure 4:
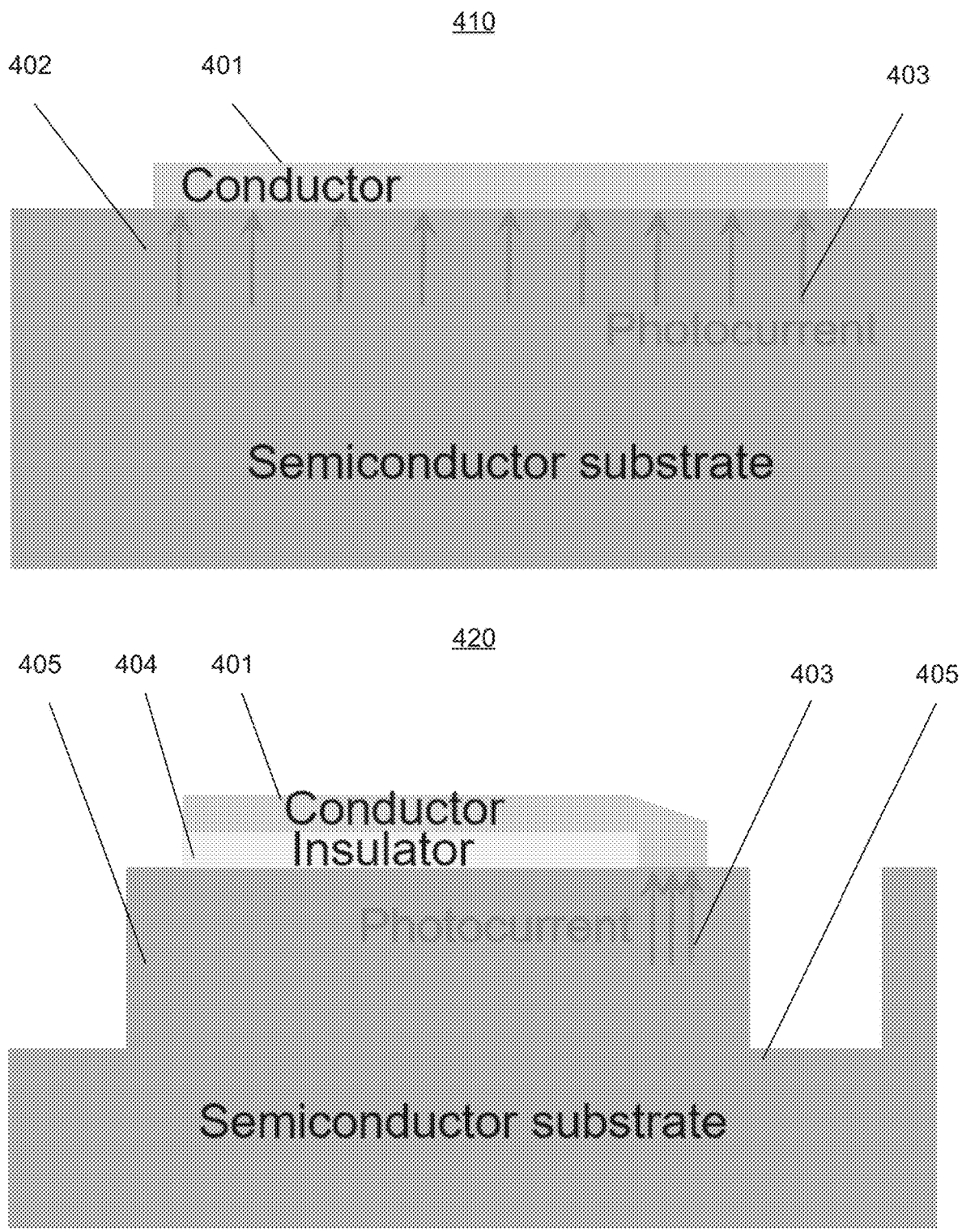
FIG. 4 illustrates variations of wavelength conversion device structures in accordance with embodiments of the invention.

A variation of the wavelength conversion device structure in accordance with an embodiment of the invention is illustrated in FIG. 4. A device structure 410 is illustrated with a semiconductor substrate (402) and a conductor layer (401) deposited on top of the semiconductor substrate. Photocurrent (403) can flow from the semiconductor substrate (402) to the conductor layer (401). A device structure 420 is shown with a semiconductor substrate (405), an electrical insulator layer (404) deposited on top of the semiconductor substrate, and a conductor layer (401) deposited on top of the electrical insulator layer. The electrical insulator layer (404) the electrical insulating layer is interposed between the semiconductor substrate (405) and the conductor layer (401) such that only a portion of the conductor layer directly contacts the semiconductor substrate. Photocurrent (403) can flow from the semiconductor substrate (405) to the conductor layer (401) through the areas that are not covered by the electrical insulator (404). The semiconductor substrate (405) can be patterned to have a plurality of features.

While specific wavelength conversion device structures are described above with reference to FIGS. 2A-2D, FIG. 3, and FIG. 4, it should be readily appreciated that any of a variety of device structures can be utilized as appropriate to the requirements of specific applications in accordance with various embodiments of the invention. As can readily be appreciated, the specific wavelength conversion device structure can depend upon factors including (but not limited to) the semiconductor substrate material(s), structures and/or geometries, the plasmonic electrode material(s) and/or geometries, combination of antenna arrays. Accordingly, wavelength conversion devices can be formed with structures appropriate to a specific application.

Semiconductor Band Bending

In order to achieve high wavelength conversion efficiencies, many embodiments provide that the semiconductor structure and nanoantenna geometry can be chosen to maximize the spatial overlap between the built-in electric field and photoabsorption profiles. The strength and extent of the built-in electric field below the semiconductor surface can be controlled by the doping profile of the semiconductor substrate in accordance with some embodiments. Several embodiments provide that increasing the doping level of the doped semiconductor layer in the semiconductor substrate can enhance the built-in electric field. A number of embodiments provide that adding an intrinsic semiconductor layer between the conductor layer and the doped semiconductor layer of the semiconductor substrate can increase the built-in electric field.

Figure 5A:
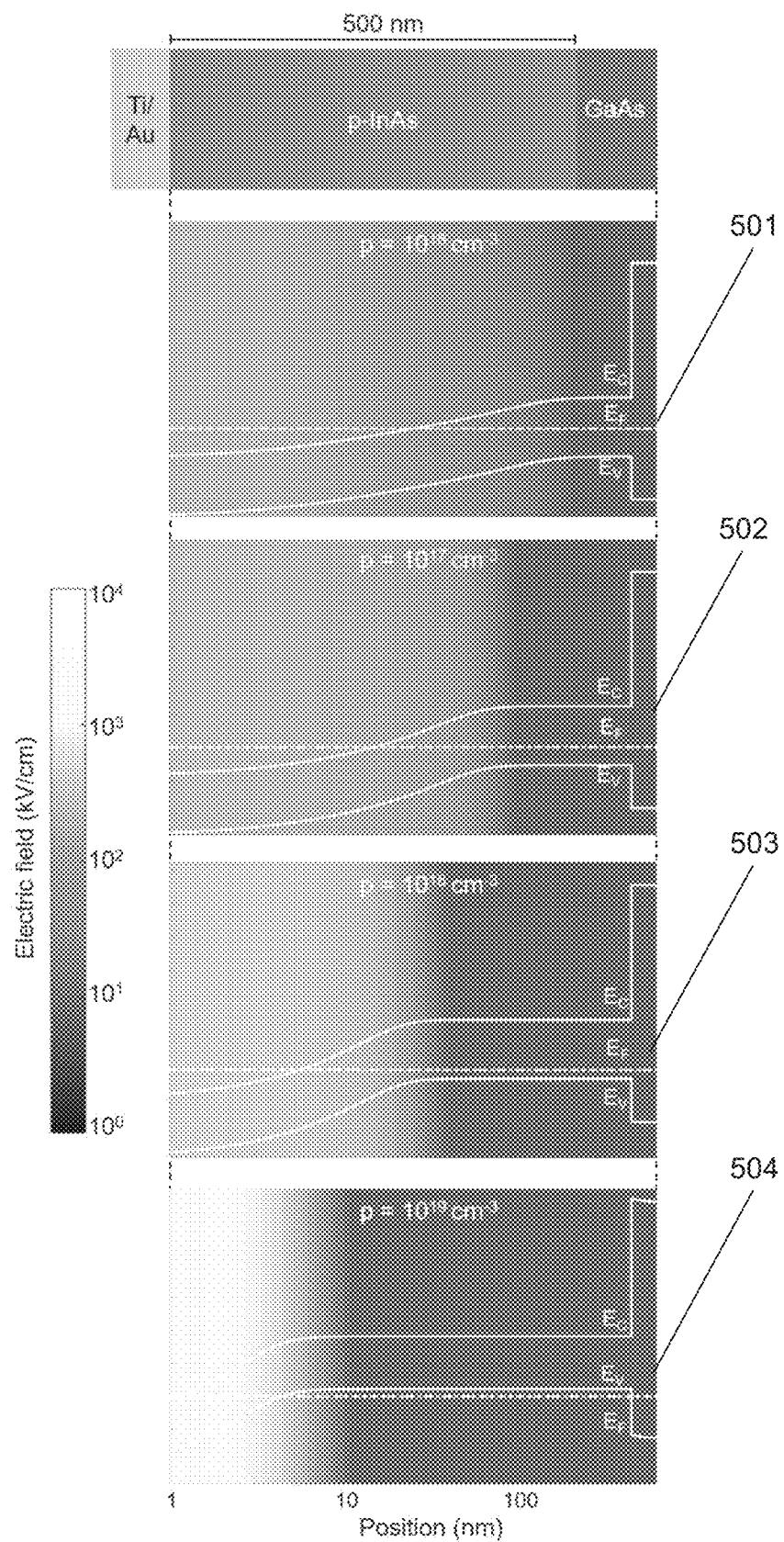
FIGS. 5A-5D illustrate built-in electric field profiles and their impact on wavelength conversion efficiency in accordance with various embodiments of the invention.

A band diagram of a p-doped InAs layer at different p-type doping concentrations in accordance with an embodiment of the invention is illustrated in Figure Band diagram of the p-doped InAs layer below the Ti/Au nanoantenna contact at different p-type doping concentrations are shown in lines. The gradient map shows the strength of the built-in electric field. InAs layers with doping levels of about $10^{16}$ cm$^{-3}$ (501), $10^{17}$ cm$^{-3}$ (502), $10^{18}$ cm$^{-3}$ (503), and $10^{19}$ cm$^{-3}$ (504) are shown. The built-in electric field causes the high-mobility photo-generated electrons to drift to the Ti/Au contact without significant barrier height and sweeps away the low-mobility photo-generated holes from the Ti/Au contact. As illustrated in FIG. 5A, since the Fermi energy level at the surface of InAs is pinned above the conduction band minimum, increasing the p-type doping of the bulk results in a steeper band bending and, therefore, a stronger built-in electric field near the InAs surface.

Figure 5B:
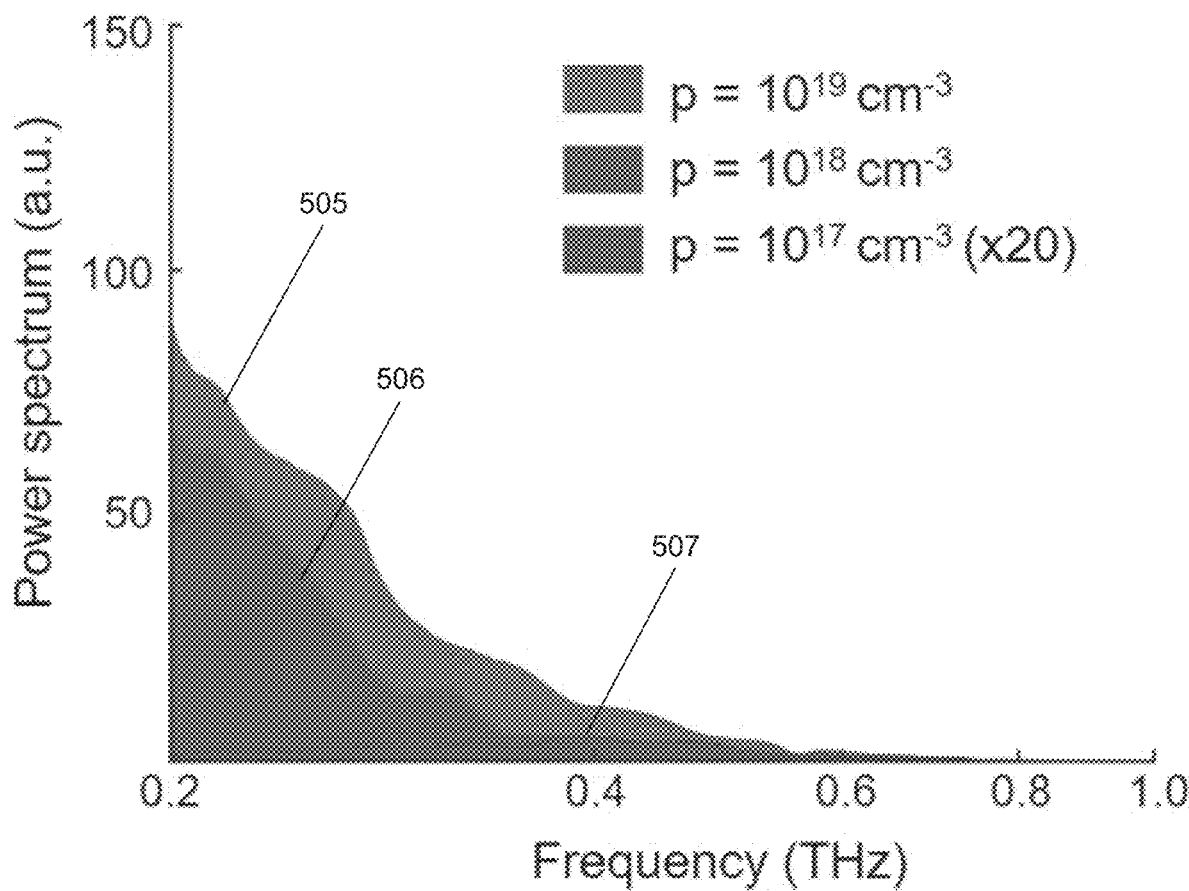

To better show the impact of the substrate doping, the performance of identical nanoantenna arrays fabricated on three InAs substrates with p-type doping concentrations of about $10^{17}$, about $10^{18}$, and about $10^{19}$ cm$^{-3}$ and their optical-to-terahertz conversion performance is characterized under the same optical pump beam. The measured terahertz radiation spectra from identical nanoantenna arrays fabricated on three InAs substrates with p-type doping concentrations of $10^{17}$, about $10^{18}$, and about $10^{19}$ cm$^{-3}$ in response to the same optical pump beam in accordance with an embodiment is illustrated in FIG. 5B. The radiation spectra are shown in a linear scale to show the wavelength conversion efficiency variations. InAs layers with a doping level of about $10^{19}$ cm$^{-3}$ (505), $10^{18}$ cm$^{-3}$ (506), and $10^{17}$ cm$^{-3}$ (507) are shown. As illustrated by the energy band diagrams in FIG. 5A, the nanoantenna array fabricated on the InAs substrate with a p-type doping concentration of approximately $10^{19}$ cm$^{-3}$ offers the highest wavelength conversion efficiency among the three as it benefits from the highest built-in electric field near the InAs surface.

Figure 5C:
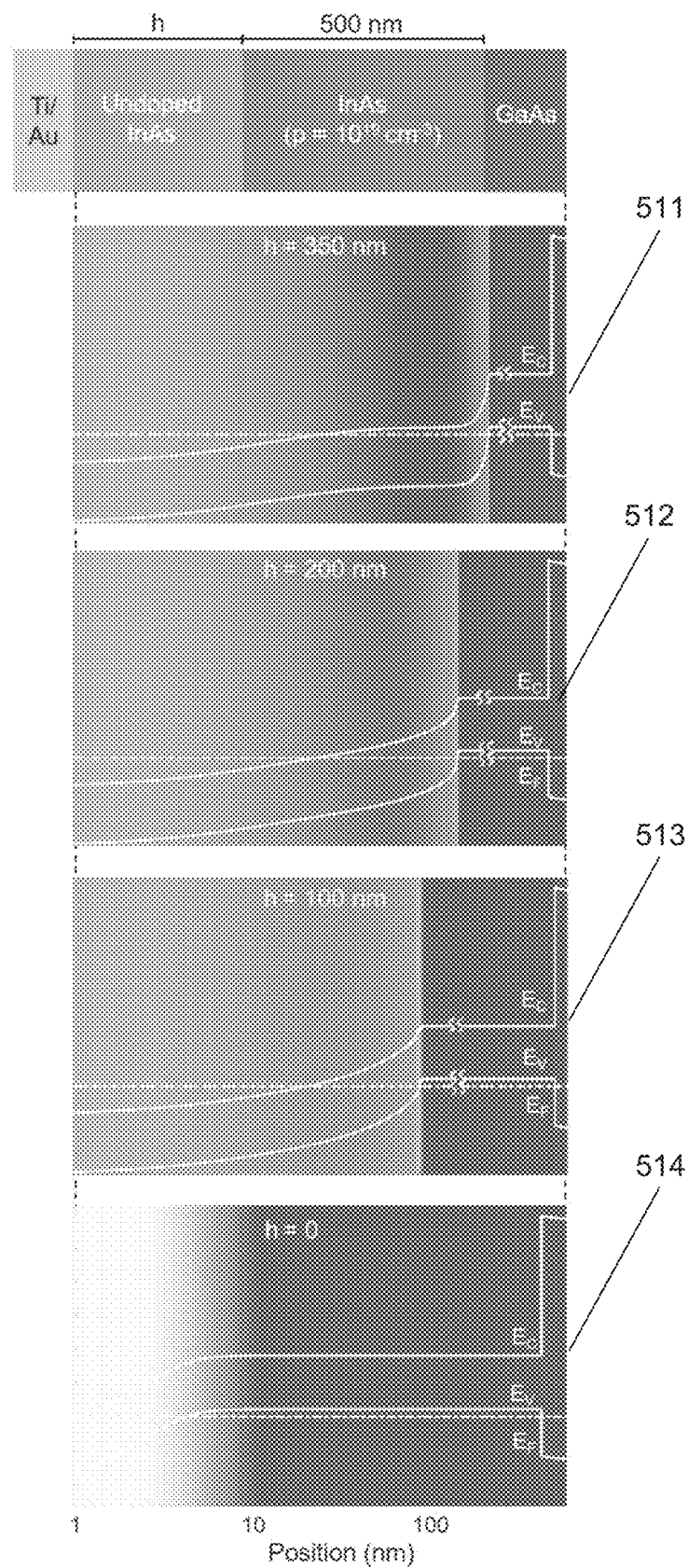

Several embodiments provide that increasing the p-type and/or n-type doping may reduce the extent of the built-in electric field below the semiconductor substrate surface (such as InAs surface) and lower the spatial overlap between the built-in electric field and photoabsorption profiles. A number of embodiments incorporate an undoped semiconductor layer between the doped semiconductor epilayer and the nanoantenna contact to extend the built-in electric field below the semiconductor substrate surface. A band diagram of an undoped InAs layer incorporated between the p-doped InAs layer and the contact in accordance with an embodiment of the invention is illustrated in Figure FIG. 5C illustrates the band diagram and the built-in electric field profiles when an undoped InAs layer is incorporated between the p-doped InAs epilayer and the Ti/Au contact. The p-doped InAs layer has a doping density of about $10^{19}$ cm$^{-3}$, and a thickness of about 500 nm. Undoped InAs layers deposited in between the Ti/Au contact and the p-doped and having thicknesses of about 350 nm (511), 200 nm (512), 100 nm (513), or (514) are considered. As illustrated in FIG. 5C, increasing the thickness of the undoped InAs layer further can extend the band bending below the InAs surface while reducing the band bending slope, indicating a tradeoff between the strength and extent of the built-in electric field in the substrate.

Figure 5D:
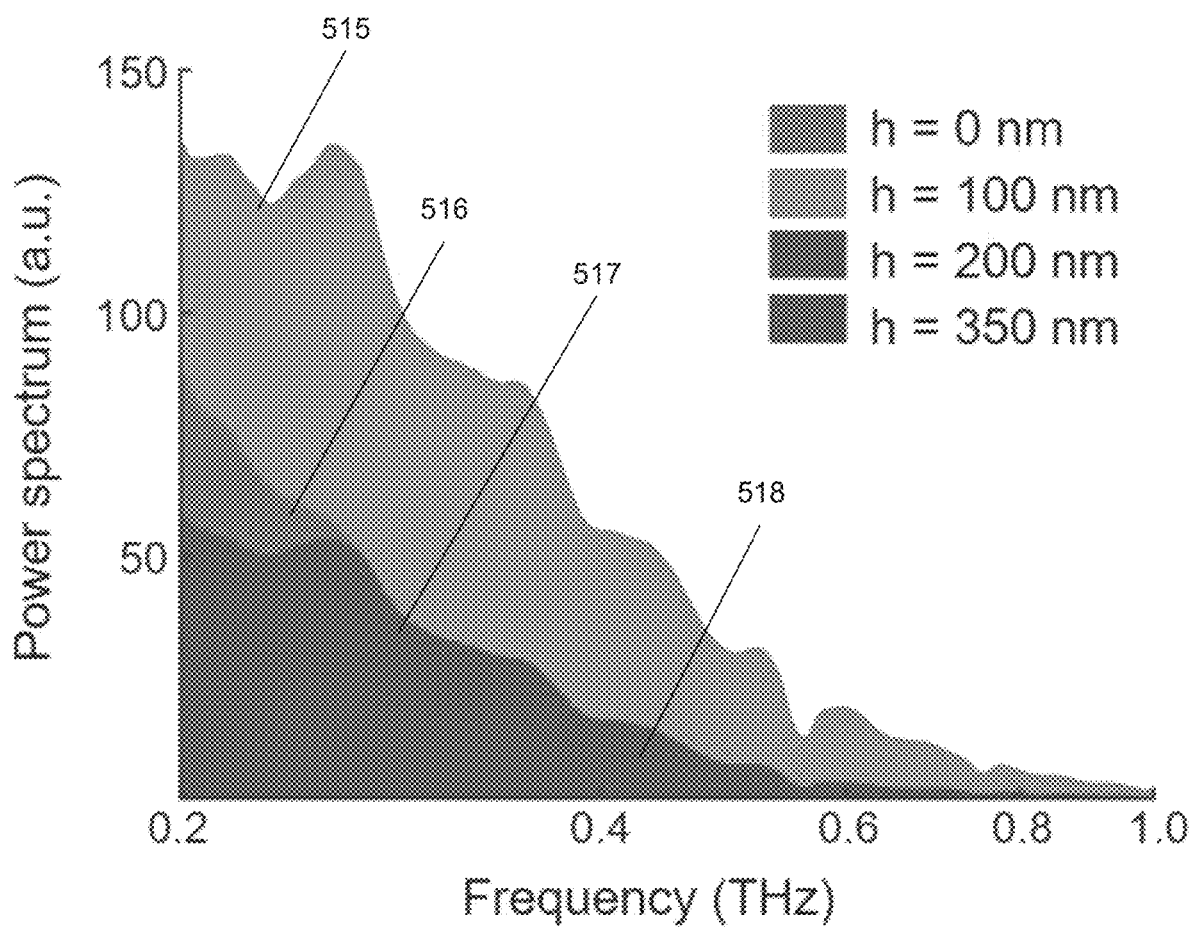

To better show the impact of this tradeoff, optical-to-terahertz conversion performance of nanoantenna arrays fabricated on four InAs substrates with undoped InAs layer thicknesses of 0, 100, 200, and 350 nm grown on an InAs epilayer and their is characterized under the same optical pump beam. The measured terahertz radiation spectra from nanoantenna arrays fabricated on four InAs substrates with undoped InAs layer thicknesses of 0, 100, 200, and 350 nm grown on an InAs epilayer with a p-type doping of $10^{19}$ cm$^{-3}$ in accordance with an embodiment of the invention is illustrated in FIG. 5D. Undoped InAs layers having thicknesses of about 100 nm (515), 0 nm (516), 200 nm (517), and 350 nm (518) are illustrated. As shown in FIG. 5D, the use of a 100-nm-thick undoped InAs layer increases the wavelength conversion efficiency by extending the built-in electric field in the semiconductor and increasing its spatial overlap within the photoabsorption profile. However, further increase in the thickness of the undoped InAs layer can lower the wavelength conversion efficiency due to the reduction in the built-in electric field strength. The nanoantenna array fabricated on a 100-nm-thick undoped InAs layer grown on an InAs epilayer with a p-type doping of $10^{19}$ cm$^{-3}$ shows a highest built-in electric field among the 4 devices.

In many embodiments, semiconductor structures with a graded composition can be used to introduce a steeper band-bending and produce stronger built-in electric field. Several embodiments incorporate a graded composition of semiconductor $In_{1-x}Ga_xAs$, with x increasing as a function of depth in the substrate, to introduce a steeper band-bending at the semiconductor surface. Several embodiments provide bias-free photoconductive emitters that use an array of nanoantennas on an InGaAs layer with a linearly graded Indium composition. The graded InGaAs structure can create a built-in electric field that extends through the entire photoconductive active region, enabling the efficient drift of the photo-generated electrons to the nanoantennas. Certain embodiments provide that semiconductor heterostructures including (but not limited to) graded InGaAs layer can create a deep built-in quasi-electric field that extends throughout the entire thickness of the InGaAs layer while maintaining a field strength that is high enough to drift the photo-generated electrons at high velocities. As a result, the number of the collected electrons by the nanoantennas that contribute to terahertz pulse generation can be increased. The nanoantenna geometry can be chosen so that surface plasmon waves are excited in response to a 1550 nm optical pump to maximize photo-generated carrier concentration near the nanoantennas, where the built-in electric field strength can be maximized. The optical generation can be significantly enhanced within a few hundred nanometers beneath each nanoantenna element by the excitation of surface plasmon waves along the nanoantennas at about 1550 nm wavelength range, greatly reducing the transit time of the photo-generated electrons to the radiating nanoantennas. With the combination of the plasmonic enhancement and built-in electric field, high-power terahertz pulses can be generated without using any external bias voltage. Some embodiments provide the terahertz pulses can be generated with about 860 μW average power at an average optical pump power of about 900 mW. Many embodiments provide that optimization of the semiconductor layer thicknesses, composition gradient, and doping levels could provide faster carrier dynamics to increase the radiation power and bandwidth of the bias-free photoconductive emitters.

Figure 6:
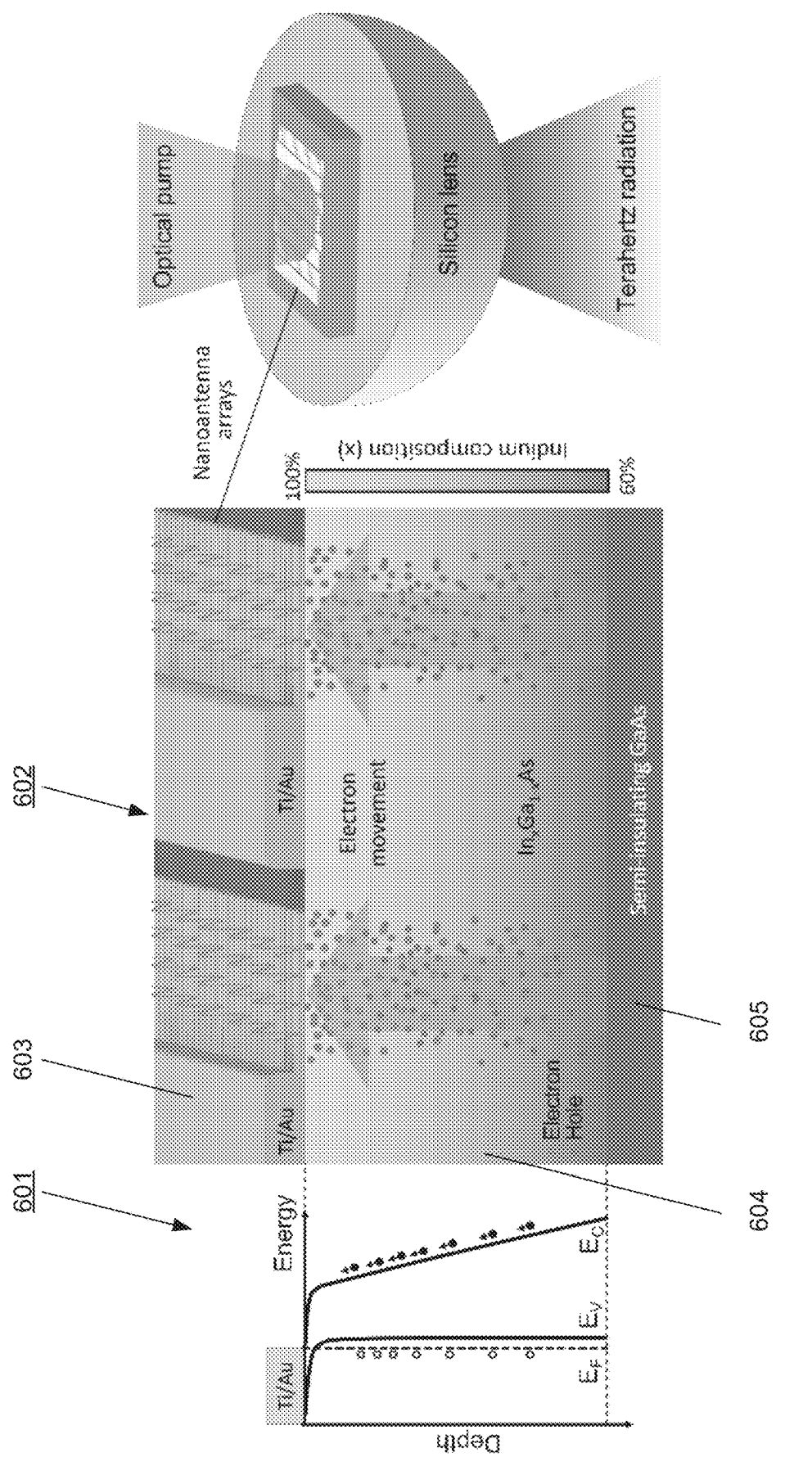
FIG. 6 illustrates energy diagrams and operation principles of the graded InGaAs emitter in accordance with embodiments of the invention.

A diagram of operation principles of the graded InGaAs emitter in accordance with an embodiment of the invention is illustrated in FIG. 6. In FIG. 6, the energy band diagram of the graded InGaAs layer is illustrated in 601, where the Fermi, conduction band minimum, and valence band maximum energy levels are marked as $E_F$, $E_c$, and $E_v$. Nanoantenna arrays (603) fabricated on a substrate including a graded InGaAs layer (604) and a semi-insulating GaAs substrate (605) are illustrated in 602. The nanoantenna array can be fabricated on a 500-nm-thick, $1.4\times10^{19}$ cm$^{-3}$ Be-doped InGaAs layer grown on a semi-insulating GaAs substrate. The InGaAs layer can have a linearly graded Indium composition varying from about 60% at the InGaAs/GaAs interface to about 100% at the surface. With the valence band (VB) flattened out due to the p+ doping, the graded bandgap creates a slope in the conduction band (CB), which induces a built-in electric field that drifts the photo-generated electrons toward the nanoantenna electrodes at the surface. The geometry of the nanoantennas can be chosen to enhance optical intensity near the nanoantennas, where the built-in field strength is maximized, by the excitation of surface plasmon waves. In order to excite surface plasmon waves at about 1550 nm wavelength range, the nanoantennas can be designed in the form of gratings with about 440 nm periodicity, 80 nm gap, and 80 nm metal height, covered by a 240-nm-thick Si3N4 anti-reflection coating.

While specific semiconductor substrate structures are described above with reference to FIGS. 5A-5D and FIG. 6, it should be understood that any of a variety of semiconductor substrate structures can be utilized as appropriate to the requirements of specific applications in accordance with various embodiments of the invention. As can readily be appreciated, the specific semiconductor structure can depend upon factors including (but not limited to) the substrate material(s), the doping levels of the semiconductor layers in the substrate, thickness of the semiconductor layers in the substrate, and/or the geometries of the semiconductor layers in the substrate. Accordingly, semiconductor substrates can be formed with materials and structures appropriate to the requirements of specific applications in accordance with various embodiments of the invention.

Plasmonic Nanoantenna Array

In many embodiments, the geometries of the nanoantenna array are chosen to provide high-efficiency radiation over a broad terahertz frequency range when fed with the injected electrons from the semiconductor substrate. In several embodiments, periodicity of the nanoantennas in the y-direction can be chosen as 440 nm to provide momentum to couple the photo-excited surface plasmon waves to the interface between the metal contact and InAs substrate when excited by a TM-polarized optical beam at a 1550 nm wavelength. A 240-nm-thick $Si_3N_4$ anti-reflection coating, a 360-nm-thick nanoantenna width, and a 3/97-nm-thick Ti/Au nanoantenna height can be used to increase the coupling efficiency of surface plasmon waves. Geometry of the nanoantenna array can be chosen to provide high-efficiency radiation over a broad terahertz frequency range when fed with the injected electrons from the InAs substrate. Radiation power can be calculated from the induced current on the nanoantennas. A finite-element-method-based electromagnetic solver (such as ANSYS-HFSS) may be used to compute the induced current on nanoantennas for various geometrical parameters as a function of frequency.

Figure 7A:
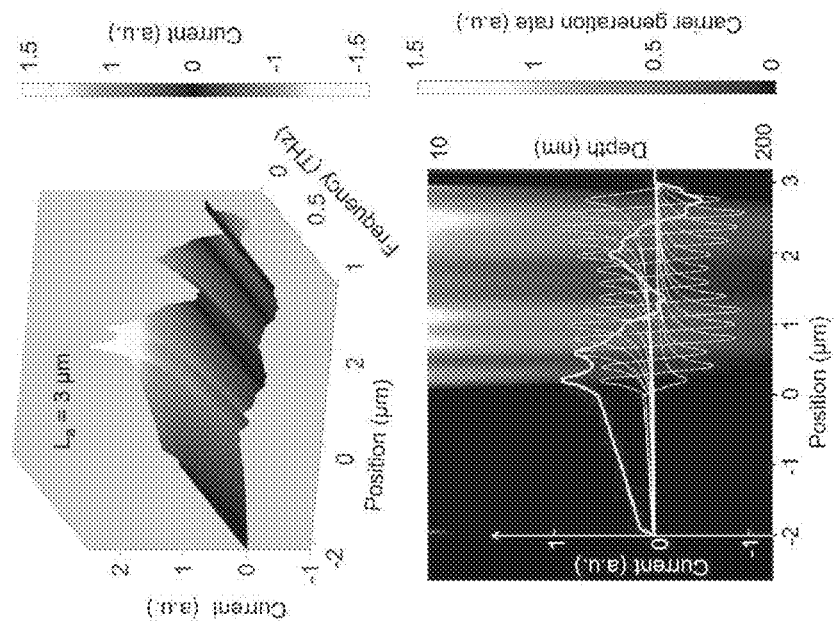
FIGS. 7A-7F illustrate the impact of the nanoantenna geometry on wavelength conversion efficiency in accordance with various embodiments of the invention.
Figure 7B:
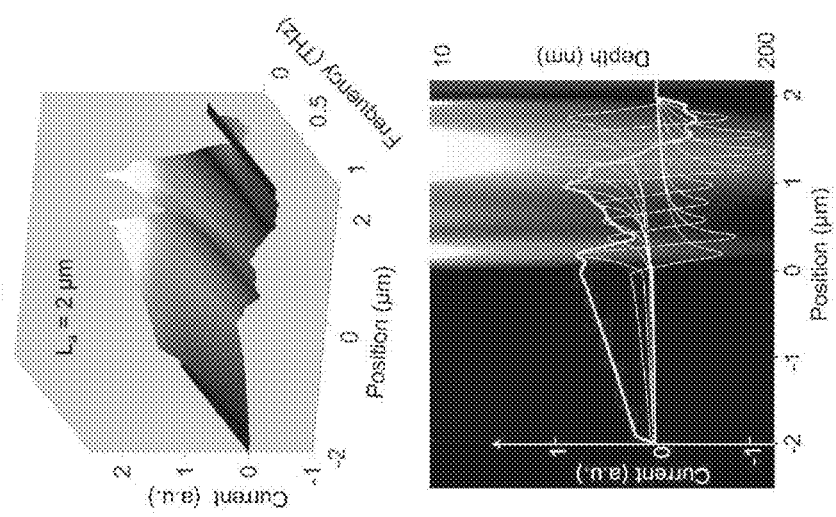
Figure 7C:
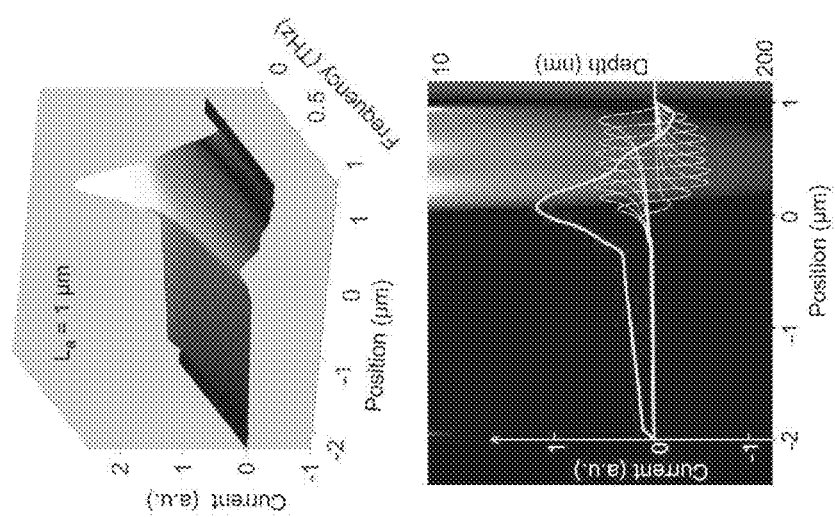
Figure 7D:
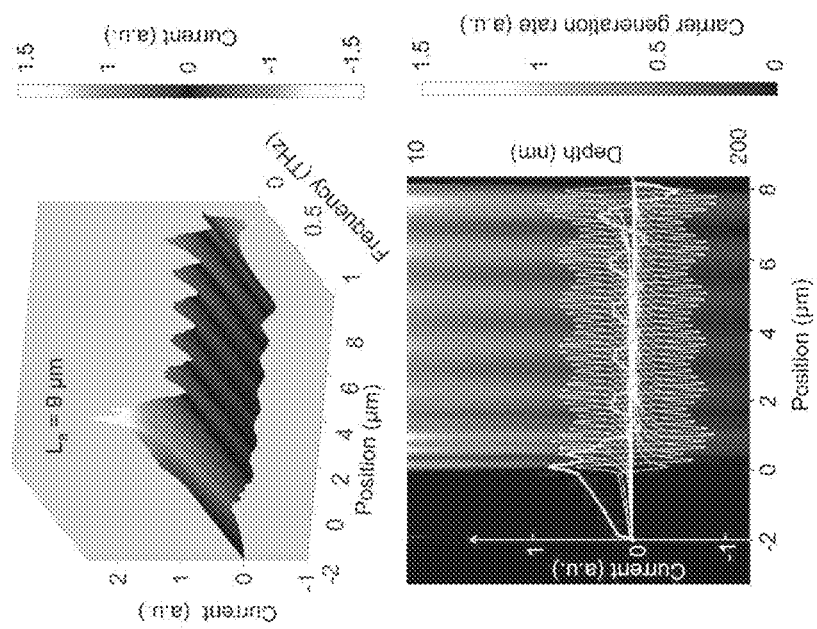
Figure 7E:
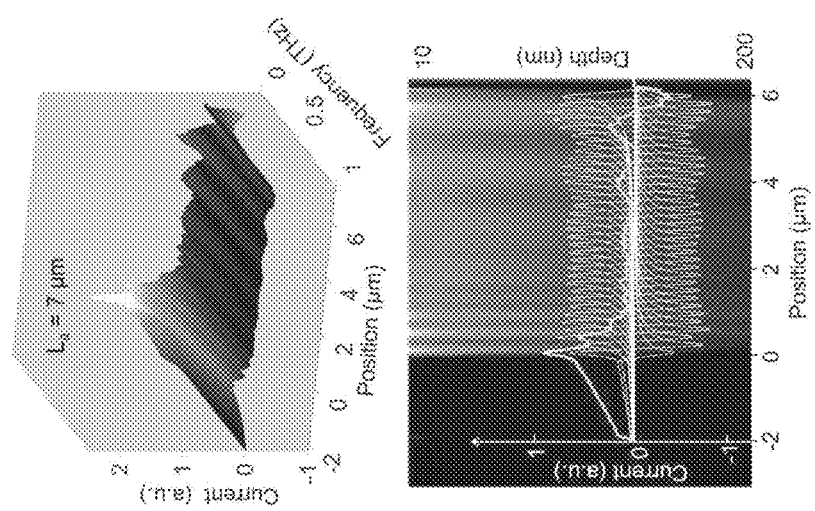
Figure 7F:
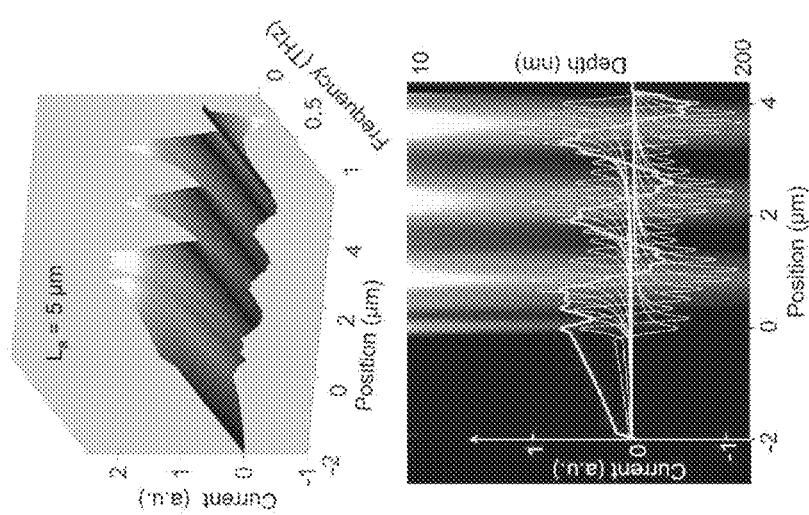

Impact of the nanoantenna geometry on the wavelength conversion efficiency in accordance with an embodiment is illustrated in FIGS. 7A-7F. FIGS. 7A-7F (top) show the induced current on the nanoantennas as a function of frequency when the nanoantenna length ($L_a$) is varied from 1 μm to 9 μm. The ground line width ($L_b$) and the gap between the nanoantenna array rows ($L_g$) are chosen as 2 μm and 0.5 μm. The ground line is located between −2 μm and 0 positions and the nanoantenna is located between 0 and 1-9 μm positions along the z-axis. The steady reduction in the current amplitudes at higher frequencies may be due to the non-zero transit time of the photogenerated electrons in InAs to the nanoantennas, which can determine the photocurrent impulse response. FIGS. 7A-7F (bottom) show the decomposition of the total induced current on the nanoantennas (single lines) to the individual contributions of the injected currents from different positions of the nanoantennas (multiple lines) at 0.2 THz. The background profile maps show the electron generation profiles averaged over the nanoantenna width. The induced current at different nanoantenna locations is proportional to the electron generation rate, which can cause the ripples observed in the total induced currents. The current that is injected near the nanoantenna tip and the nanoantenna-ground line intersection has the highest contribution to the total induced current on the nanoantennas. As the injection point is moved from these margins, the induced current may split into two near-equal current components that are 180 degrees out-of-phase from one another, resulting in a destructive radiation from these out-of-phase current components. As the nanoantenna length is decreased from 9 μm (FIG. 7F) to 2 μm (FIG. 7B), the regions on the nanoantenna that do not contribute to the radiation may be eliminated and the current density on the nanoantennas is increased, resulting in higher radiation powers. When the antenna length is reduced below 2 μm, the injected current to the nanoantenna is reduced because the ground lines shadow a major fraction of the optical beam, reducing the number of the photogenerated electrons in InAs (FIG. 7A).

Apart from the nanoantenna length, the ground line width ($L_b$) and the gap between the nanoantenna array rows ($L_g$) can also impact the radiation efficiency. Increasing the width of the ground lines can provide a lower impedance ground path for the current flow through the nanoantennas, resulting in an increase in the induced current. However, increasing the ground line width beyond 2 μm may reduce the injected current to the nanoantenna because the ground lines shadow a major fraction of the optical beam, reducing the number of the photogenerated electrons in InAs. Additionally, since the photogenerated electrons inside the gap between the nanoantenna array rows do not contribute to the radiation, this gap may be kept very small to maximize the fill factor of the radiating elements.

Figure 8A:
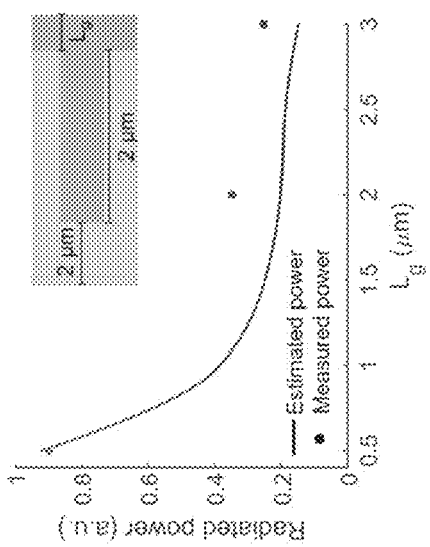
FIGS. 8A-8C illustrate terahertz radiation power from fabricated nanoantenna arrays with different nanoantenna lengths, ground line widths, and gap sizes between the nanoantenna rows in accordance with various embodiments of the invention.
Figure 8B:
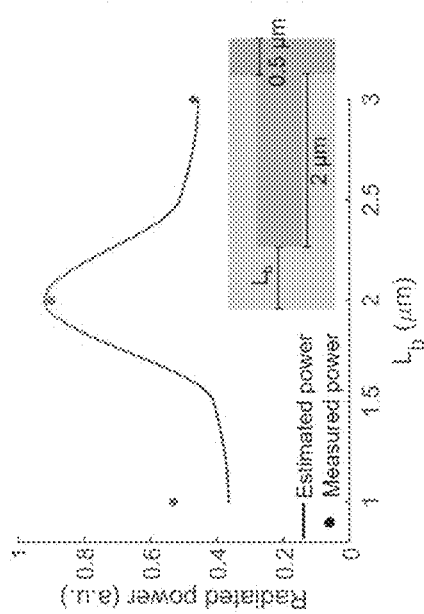
Figure 8C:
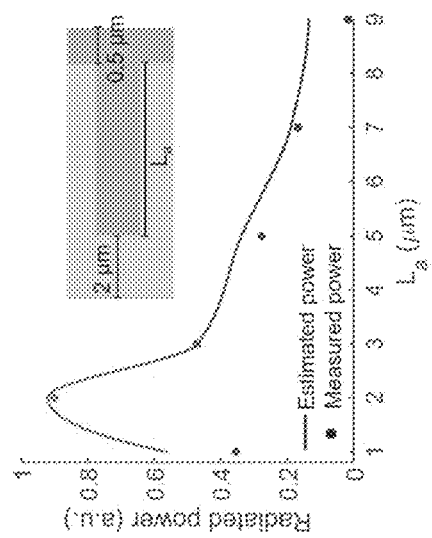

To better show the impact of the nanoantenna geometry, nanoantenna arrays with different nanoantenna lengths, ground line widths, and gap sizes between the nanoantenna rows were fabricated with a total area of 1×1 mm² and their radiation power characterized under the same femtosecond optical pulse illumination. Predicted and measured terahertz radiation power from fabricated nanoantenna arrays with different nanoantenna lengths, ground line widths, and gaps sizes between the nanoantenna rows in accordance with an embodiments are illustrated in FIGS. 8A-8C. The fabricated nanoantenna arrays have an approximately 1×1 mm² area and are characterized using the same optical pulses with 120 fs pulse width, 2.63 nJ pulse energy, and 76 MHz repetition rate. As illustrated in FIGS. 8A-8C, the measured terahertz radiation powers are in agreement with the theoretical predictions based on the induced current profiles on the nanoantennas.

While specific nanoantenna geometries are described above with reference to FIGS. 7A-7F and FIGS. 8A-8C, it should be readily appreciated that any of a variety of nanoantenna geometries can be utilized as appropriate to the requirements of specific applications in accordance with various embodiments of the invention. As can readily be appreciated, the specific nanoantenna geometry can depend upon factors including (but not limited to) the substrate material(s), the material(s) used in the construction of the nanoantenna, the injection point, the optical frequency and/or the terahertz frequency range of the system. Accordingly, nanoantennas can be formed with geometries appropriate to a specific application.

Doctrine of Equivalents

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A wavelength conversion device comprising:
   at least one semiconductor substrate; and
   at least one conductive layer;

wherein the semiconductor substrate comprises at least one region that has a built-in electric field;

wherein the conductive layer comprises at least one electrode with at least one optical subwavelength dimension; and wherein the at least one electrode is capable of bending incident optical light to couple with the at least one region that has the built-in electric field to convert the optical wavelength to a different wavelength of the electromagnetic spectrum.

2. The wavelength conversion device of claim 1, wherein the built-in electric field is generated by a source selected from the group consisting of: at least one semiconductor surface state, a Schottky contact, and a semiconductor heterostructure.

3. The wavelength conversion device of claim 1 further comprising, at least one antenna.

4. The wavelength conversion device of claim 1, wherein the at least one electrode converts the optical wavelength ranging from 300 nm to 2 microns to a wavelength ranging from 3 mm to 30 microns.

5. The wavelength conversion device of claim 1, wherein the wavelength conversion device does not have an external electrical power source.

6. The wavelength conversion device of claim 1, wherein the at least one electrode has a structure selected from the group consisting of circular, rectangular, triangular, cross, bow ties, H-shape, and C-shape.

7. The wavelength conversion device of claim 1, wherein the at least one electrode is a subwavelength grating.

8. The wavelength conversion device of claim 1, wherein the at least one semiconductor substrate comprises silicon, germanium, or an alloy, wherein at least one element of the alloy is selected from the group consisting of indium, aluminum, gallium, arsenic, antimony, phosphorus, silicon, and germanium.

9. The wavelength conversion device of claim 1, wherein the at least one semiconductor substrate comprises an intrinsic semiconductor layer and a doped semiconductor layer with a doping density ranging from about $10^{16}$ cm$^{-3}$ to about $10^{19}$ cm$^{-3}$, wherein the semiconductor layer is p-type doped or n-type doped.

10. The wavelength conversion device of claim 1, wherein the at least one semiconductor substrate comprises an alloy with a graded composition.

11. The wavelength conversion device of claim 1, wherein the at least one conductive layer comprises a material selected from the group consisting of a metal, a high-conductivity semiconductor, and a 2D material.

12. The wavelength conversion device of claim 11, wherein the 2D material is graphene.

13. The wavelength conversion device of claim 1, wherein the optical light is a femtosecond optical pulse train or a heterodyning optical beam with a beat frequency ranging from 100 GHz to 10 THz.

14. The wavelength conversion device of claim 1, further comprising:

at least one electrical insulator layer;

wherein the at least one electrical insulator layer is interposed between the at least one semiconductor substrate and the at least one conductive layer such that only a portion of the at least one electrode directly contacts the at least one semiconductor substrate.

15. The wavelength conversion device of claim 14, wherein the at least one electrical insulator layer comprises a material selected from the group consisting of silicon dioxide, silicon nitride, and sapphire.

16. The wavelength conversion device of claim 14, wherein at least one-tenth of the at least one electrode directly contacts the at least one semiconductor substrate.

17. The wavelength conversion device of claim 1, further comprising an optical reflector layer, wherein the optical reflector layer is embedded in the at least one semiconductor substrate.

18. The wavelength conversion device of claim 17, wherein the optical reflector layer is selected from the group consisting of: a distributed Bragg reflector (DBR), and a metal layer.

19. The wavelength conversion device of claim 1, wherein the at least one semiconductor substrate is patterned.

* * * * *